United States Patent Office 3,655,679
Patented Apr. 11, 1972

3,655,679
CERTAIN ARYL PYRIDINE CARBOXYLIC
ACID DERIVATIVES
Tsung-Ying Shen, Westfield, William V. Ruyle, Scotch Plains, and Gordon L. Walford and Bruce E. Witzel, Westfield, N.J., assignors to Merck & Co., Inc., Rahway, N.J.
No Drawing. Filed June 25, 1969, Ser. No. 836,621
Int. Cl. C07d 31/36
U.S. Cl. 260—295 R
13 Claims

ABSTRACT OF THE DISCLOSURE

Aryl pyridine carboxylic acids and their derivatives are described and the processes for preparing the same are disclosed. These compounds exhibit anti-inflammatory properties and also possess an effective degree of antipyretic and analgesic activity.

SUMMARY OF THE INVENTION

This invention describes aryl pyridine carboxylic acids and their derivatives, processes for preparing the same, and the method of treatment of these compounds as medicinal agents. The disclosed class of compounds in this invention exhibit anti-inflammatory properties and are effective for the prevention and inhibition of edema and granuloma tissue formation.

BACKGROUND O FTHE INVENTION

Despite all the research carried on in the development of anti-inflammatory drugs in the past two decades, our knowledge of inflammation remains largely descriptive and we still have little progress; however, we have seen the growth of a great many new drugs. Most of these have been steroids of the 11-oxygenated pregnane series. These, while effective, are complex in structure. There is a need in the market for equally effective compounds of simpler structure.

We have found that the aryl pyridine carboxylic acids of this invention are effective nonsteroidal anti-inflammatory agents.

DESCRIPTION AND PREFERRED
EMBODIMENTS

This invention relates to new chemical compounds which contain an aryl or substituted-aryl radical attached to a pyridine ring bearing a carboxylic acid group and a hydroxy group which are ortho to each other and one of which is para to the aryl radical. This invention further relates to the non-toxic pharmaceutically acceptable salts, esters and amides of these carboxylic acids. Included also in this invention are the methods of preparation and treatment as medicinal agents for the disclosed compounds.

The scope of this invention embraces the following types of compounds:

(A) 2-aryl-5-hydroxyisonicotinic acids
(B) 5-aryl-3-hydroxypicolinic acids
(C) 6-aryl-3-hydroxypicolinic acids
(D) 5-aryl-2-hydroxynicotinic acids
(E) 6-aryl-2-hydroxynicotinic acids
(F) 6-aryl-4-hydroxynicotinic acids The compounds of this invention may be described by the following general formula:

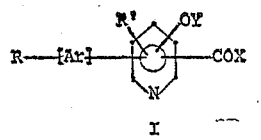

where —COX and —OY are ortho to each other and [Ar] is para to either —COX or —OY; and where

[Ar] is any benzenoid or non-benzenoid aromatic-like structure (preferably phenyl, styryl, naphthyl, etc.) containing one or more R substituents which may be at any position on the ring (preferably at the 4-position); is hydrogen, alkyl (preferably lower alkyl such as methyl, ethyl, propyl, i-propyl, etc.), alkenyl (preferably lower alkenyl such as vinyl, allyl, etc.), halogen (preferably fluoro and chloro), haloalkyl (preferably haloloweralkyl such as trifluoromethyl), hydroxy, alkoxy (preferably lower alkoxy such as methoxy, ethoxy, etc.), acyloxy, nitro, amino, alkylamino (preferably lower alkylamino such as methylamino, ethylamino, etc.), dialkylamino (preferably dilower alkylamino such as dimethylamino, methylethylamino, etc.), acylamino (preferably acetamido, benzoylamino, etc.), mercapto, alkylthio (preferably lower alkylthio such as methylthio, ethylthio, etc.), alkylsulfonyl (preferably lower alkylsulfonyl such as methylsulfonyl), or alkylsulfinyl (preferably lower alkylsulfinyl such as methylsulfinyl);

X is —OH, —NH$_2$, akylamino (preferably lower alkylamino such as methylamino, ethylamino, etc.), dialkylamino (preferably dilower alkylamino such as dimethylamino, methylethylamino, etc.), cycloalkylamino preferably cyclolower alkylamino such as cyclopropylamino, cyclobutylamino, etc.), N-heterocyclo (preferably N-piperidino, N-morpholino, N-piperazino, N-homopiperazino, N-pyrrolidino, etc.), alkoxy (preferably lower alkoxy such as methoxy, ethoxy, etc.), aralkoxy (such as benzyloxy) or OM, where M in general is any base which will form an acid addition salt with a carboxylic acid and whose pharmaceutical properties will not cause an adverse physiological effect when ingested by the body system [preferably an alkali or alkaline earth metal (such as sodium, potassium, calcium and magnesium) or aluminum];

Y is hydrogen, alkyl (preferably lower alkyl such as methyl, ethyl, propyl, i-propyl, butyl, s-butyl, t-butyl, etc.), alkenyl preferably lower alkenyl such as allyl, vinyl, methallyl, etc.), aralkyl (preferably benzyl or phenethyl), aryl (preferably phenyl), acyl (preferably acetyl, propionyl, benzoyl, etc.), or alkoxycarbonyl preferably lower alkoxycarbonyl such as methoxycarbonyl, ethoxycarbonyl, etc.);

R' may be in any available position on the pyridine ring and is hydrogen or alkyl (preferably lower alkyl such as methyl, ethyl, propyl, etc.), and with the proviso that when the structure is a 2-hydroxynicotinic acid, R cannot be hydrogen when R' is hydrogen or methyl, and with the further proviso that R cannot be p-methyl when R' is hydrogen.

It will further be appreciated by one skilled in the art that the following radicals may be employed in the practice of this invention:

where

R is aminoalkyl (preferably aminoloweralkyl such as aminomethyl, aminoethyl, etc.), alkylaminoalkyl, (preferably loweralkylaminoloweralkyl such as methylaminomethyl, ethylaminomethyl, etc.), hydroxyalkyl (preferably hydroxyloweralkyl such as hydroxymethyl, hydroxyethyl, hydroxypropyl, etc.), alkoxyalkyl, (preferably loweralkoxylower alkyl such as methoxymethyl, methoxyethyl, ethoxyethyl, ethoxypropyl, etc.), mercaptoalkyl (preferably mercaptoloweralkyl such as mercaptomethyl, mercaptoethyl, etc.), alkylmercaptoalkyl preferably loweralkylmercaptoloweralkyl such as methyl-mercaptomethyl, ethylmercaptoethyl, ethylmercaptopropyl, etc.), cyano, carboxyl, carboalkoxy (carbomethoxy, carboethoxy, etc.), carbamyl, aryl (such as phenyl, tolyl, etc.), aralkyl (such as benzyl, phenethyl, etc.), aryloxy, aralkoxy, and acyl and X is hydroxyloweralkoxxy, loweralkoxyloweralkoxy, diloweralkylaminoloweralkoxy, aralkoxy( such as benzyloxy, phenethoxy, etc.), phenoxy, substituted phenoxy, diloweralkylaminoloweralkyl or hydroxyloweralkylamino.

A more preferred aspect of this invention relates to the compounds of Formula I where [Ar] is phenyl or halophenyl; X is —OH, —NH$_2$, dimethylamino, methoxy or ethoxy; Y is hydrogen or acetyl and R' is hydrogen; with the proviso that when the structure is a 2-hydroxynicotinic acid, R and R' cannot both be hydrogen.

Representative compounds of this invention are as follows:

6-(p-fluorophenyl)-3-acetoxyisonicotinic acid
5-(p-fluorophenyl)-3-hydroxypicolinic acid
6-(p-fluorophenyl)-3-methoxypicolinic acid
5-(p-fluorophenyl)-2-hydroxynicotinic acid
6-(p-chlorophenyl)-2-hydroxynicotinamide
6-(p-fluorophenyl)-2-hydroxy-4-methylnicotinic acid
6-(p-pentafluorophenyl)-5-acetoxynicotinic acid
6-(o-methylphenyl)-3-hydroxyisonicotinic acid
6-(p-dimethylaminophenyl)-3-acetoxypicolinic acid
methyl 5-(p-hydroxyphenyl)-3-acetoxypicolinate
6-(α-naphthyl)-3-acetoxypicolinic acid
6-(p-fluorophenyl)-3-methylcarbonyldioxyisonicotinic acid We have found that the compounds of this invention have a useful degree of anti-inflammatory activity and are effective in the treatment of arthritic and dermatological disorders and in like conditions which are responsive to treatment with anti-inflammatory agents. For these purposes, they may be administered orally, topically, parenterally or rectally. Orally they may be administered in tablets or capsules, the optimum dosage depending, of course, on the particular compound being used and the type and severity of the condition being treated. Although the optimum quantities of the compounds of this invention to be used in such manner will depend on the compound employed and the particular type of disease condition treated, oral dose levels of preferred compounds in the range of 1–100 mg./kg. per day (preferably in the range of 2–50 mg./kg. per day) are useful in control of arthritic conditions, depending on the activity of the specific compound and the reaction sensitivity of the patient. Comparative dosages may be used in topical, parenteral or rectal administration.

Various tests in animals have been carried out to show the ability of the compounds of this invention to exhibit reactions that can be correlated with activity in humans. One such test as outlined by Charles A. Winter in Proceedings Society of Experimental Biology and Medicine, 1962, III, 544, shows the ability of compounds to inhibit edema induced by injection of an inflammatory agent into the tissue of the foot of a rat against non-inflamed controls.

The activity of the instant compounds when tested by the procedure of Winter et al., as outlined above, indicates that they are considered to have anti-inflammatory effectiveness.

The arylpyridine carboxylic acids of this invention are prepared by the methods below. Each method of preparation is described and followed by the specific reaction equation. It further contains a reference where that method may be found in the examples of the invention.

(A) 2-Aryl-5-hydroxyisonicotinic acids

Formation of an alkyl aroylpyruvate is accomplished by reaction of a dialkyl oxalate with an arylmethyl ketone in a metal alkoxide medium. When this is reacted with cyanoacetamide in the presence of an organic base (preferably secondary amine), then a 4-carboalkoxy-3-cyano-6-aryl-2[1H]-pyridone is prepared. Treatment of this pyridone with a mixture of POCl$_3$ and PCl$_5$ affords an alkyl 2-chloro-3-cyano-6-arylisonicotinate which is then dehalogenated using a metal catalyst. The resulting alkyl 5-cyano-2-arylisonicotinate can then be treated with aqueous ammonia to give the 6-arylcinchomeronimide-α-imine which upon contact with dilute acid forms the 6-arylcinchomeronimide. The α-imine can also be treated with a metal hypochlorite solution to form a 2,4-dihydroxy-6-arylcopazoline (Examples 1–6 and 12).

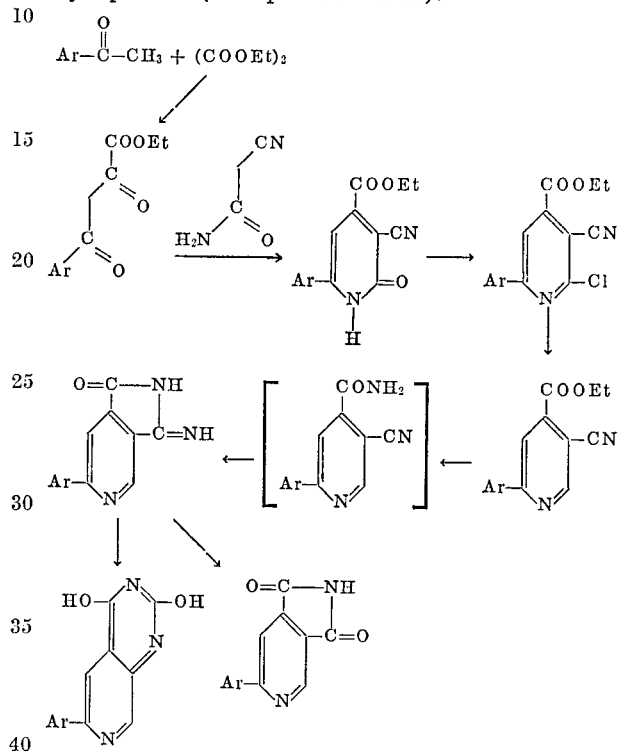

When the alkyl 5-cyano-2-arylisonicotinate is treated with basic solution, ammonia is liberated and the 6-arylcinchomeronic acid is formed. Treatment of the cinchomeronic acid with alcoholic acid results in the diester which can then be converted to the diamide with alcoholic ammonia. When the temperature is raised, ammonia is evolved and the product that results is the 6-arylcinchomeronimide (Examples 7 and 9–10).

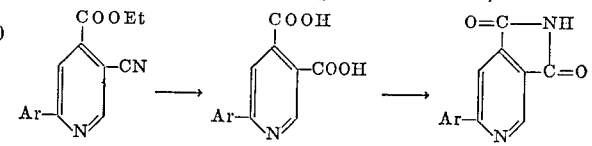

Alkyl aroylpyruvates condense with alkyl β-aminoacrylates and their various homologs to form alkyl 2-alkyl-6-arylcinchomeronates. Hydrolysis of the esters results in the 2-alkyl-6-arylcinchomeronic acids which are converted to the 2-alkyl-6-arylcinchomeronimides as described above (Examples 8 and 9–10).

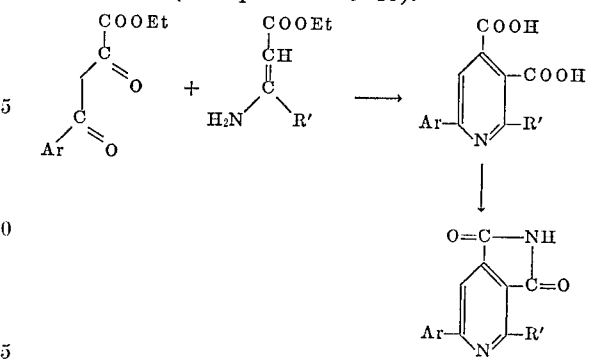

The 6-arylcinchomeronic acids and 2-alkyl-6-arylcinchomeronic acids may also be converted to the corresponding cinchomeronimides by reaction with acetic anhydride to form the cinchomeronic acid anhydrides which are then reacted further with a mixture of acetic anhydride and acetamide (Example 11).

When the 6-arylcinchomeronimide intermediate is reacted with an alkaline solution of a metal hypobromite, rearrangement occurs to form a 3-amino-6-arylisonicotinic acid. These compounds may also be formed from the 2,4-dihydroxy-6-arylcopazolines by subjecting them to high temperatures in basic media. The amino group is then diazotized to form the desired 2-aryl-5-hydroxyisonicotinic acid products (Examples 13–15).

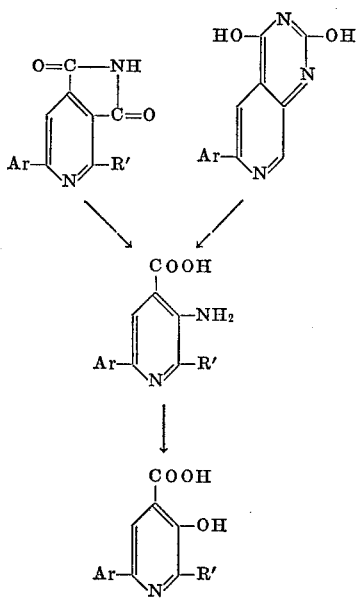

A further method or preparing 2-aryl-5-hydroxy-isonicotinic acids involves a diazonium reaction of a substituted benzene with 2-amino-5-nitro-4-picoline or 2-amino-5-bromo-4-picoline (Example 16).

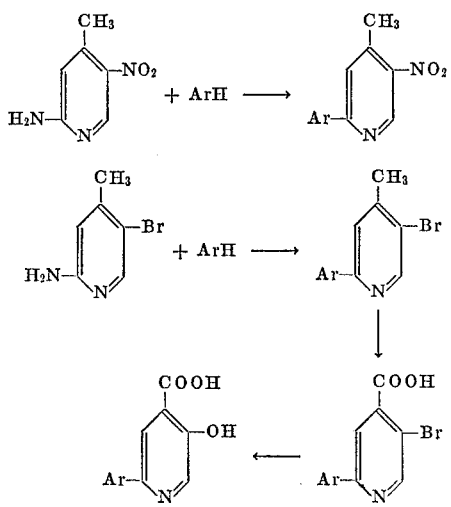

The 2-aryl-5-bromo-4-picolines are subjected to permanganate oxidation of the methyl group followed by hydrolysis of the bromo group using a copper catalyst to give the desired 5-hydroxy-2-arylisonicotinic acids (Examples 17 and 19).

The 2-aryl-5-nitro-4-picoline can first be oxidized to the 2-aryl-5-nitroisonicotinic acid and then the nitro group reduced and diazotized to obtain the 5-hydroxy-2-arylisonicotinic acid (Examples 15, 17 and 18).

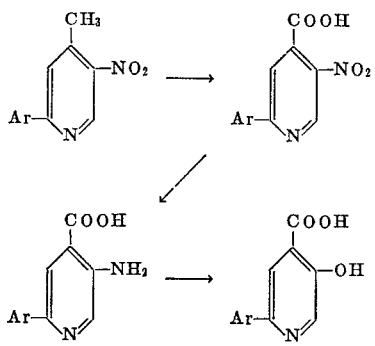

The 2-aryl-5-hydroxyisonicotinic acids can be easily converted to the corresponding esters and amides by conventional methods. The 5-hydroxy group can also be converted to the desired derivative by conventional methods.

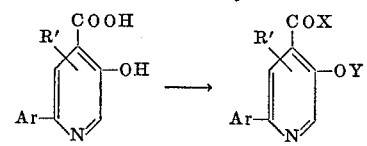

(B) 5-aryl-3-hydroxypicolinic acids

A modified Gomberg-Bachmann reaction using as starting materials a substituted benzene compound and 3-amino-5-nitropyridine affords a 3-aryl-5-nitropyridine. Catalytic reduction of the nitro group and subsequent diazotization, results in the corresponding 5-aryl-3-pyridinol. When an alkali metal salt of this compound is heated in a carbon dioxide atmosphere at increased pressures, the 5-aryl-3-hydroxypicolinic acid is prepared (Examples 20–23).

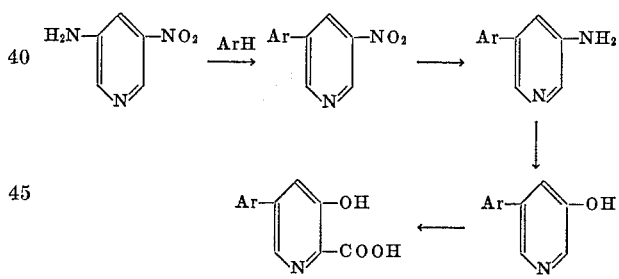

When 5-aryl-3-pyridinols are treated with formaldehyde in basic solution, the 5-aryl-3-hydroxy-2-hydroxymethylpyridines are prepared. These intermediates are then benzylated at the 3-hydroxy position, followed by oxidization to the 3-benzyloxy-5-arylpicolinic acids. Hydrogenolysis of the 3-benzyloxy group results in 5-aryl-3-hydroxypicolinic acids (Examples 24–25).

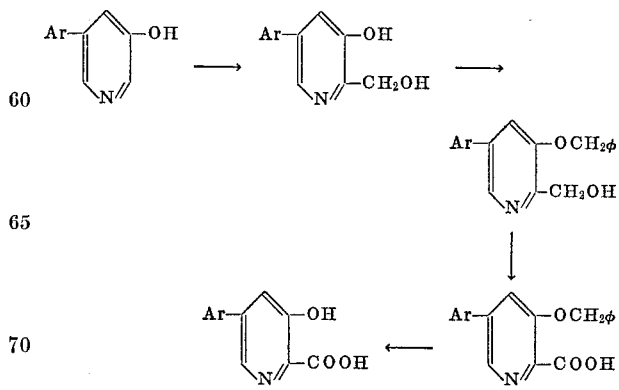

5-arylquinolinic acids are obtained by a condensation procedure from arylacetaldehydes, propionaldehyde and ammonia, followed by permanganate oxidation of the formed 5-aryl-2,3-dialkylpyridines. The ammonium salt of the 5-arylquinolinic acid is prepared and then heated with acetic anhydride. The resulting 5-aryl quinolinimide is converted to the corresponding 3-amino-5-arylpicolinic acid by treatment with an alkaline solution of a metal hypobromite. Diazotization affords the 5-aryl-3-hydroxypicolinic acid (Examples 26–29).

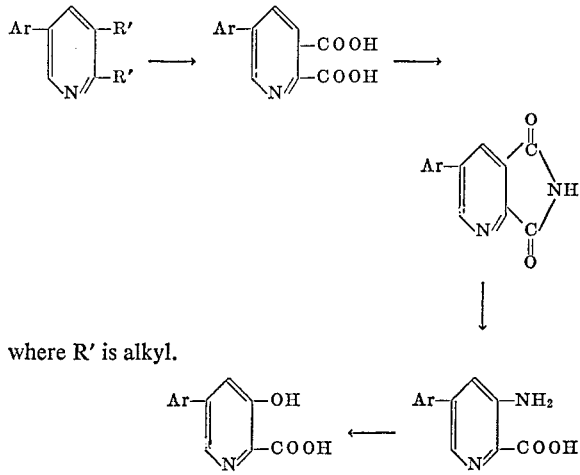

where R′ is alkyl.

Chlorination of 5-aryl-2-hydroxynicotinic acid with a phosphorus oxychloride-phosphorus pentachloride mixture results in 5-aryl-2-chloronicotinic acid chloride. If the reaction mixture is treated with an absolute alkanol, the alkyl 5-aryl-2-chloronicotinate is prepared. Catalytic reduction results in dehalogenation of the 2-chloro group and alkyl 5-arylnicotinate results. Amidation of the ester with ammonia, followed by treatment with an alkaline solution of a metal hypobromite, yields 3-amino-5-arylpyridine which is then diazotized and converted as above to the desired 5-aryl-3-hydroxypicolinic acid (Examples 30, 31, 39, 40 and 22–25).

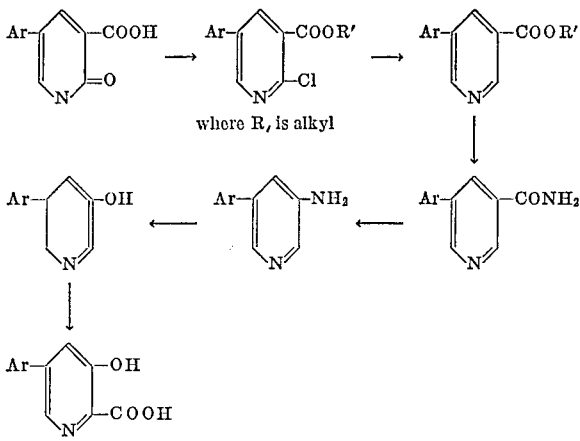

A further method of preparing the alkyl 5-aryl-nicotinate is accomplished by means of the modified Gomberg-Bachmann reaction using 5-amino-3-picoline to obtain 5-aryl-3-picoline. This is then oxidized with permanganate to the 5-arylnicotinic acid and then esterified (Examples 20, 33 and 34).

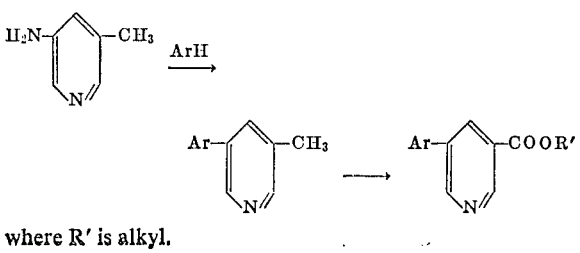

where R′ is alkyl.

Treatment of 5-aryl-2-hydroxynicotinic acids with a phosphorus oxychloride-phosphorus pentachloride mixture followed by reacting with a metal azide and acidifying gives 3-amino-5-aryl - 2 - chloropyridine. Reaction with cuprous cyanide results in the 3-amino-5-aryl-2-cyanopyridine which is hydrolyzed to the 3-amino-5-aryl-picolinic acid and diazotized to the 5-aryl-3-hydroxy-picolinic acid as above (Examples 41–43 and 29).

Following the reaction of the 5-aryl-2-chloronicotinic acid chloride with a metal azide as above, the reaction mixture may be treated with an absolute alcohol to give the corresponding urethan derivative of 3-amino-5-aryl-2-chloropyridine, which can be hydrolyzed and dehalogenated to give the corresponding 3-amino-5-arylpridine.

The 3-amino-aryl-2-chloropyridines may also be first diazotized to the 3-hydroxy compounds and then converted to the 5-aryl-2-cyano-3-hydroxypyridines which can be hydrolyzed to the desired picolinic acids (Examples 22, 42, 43 and 29).

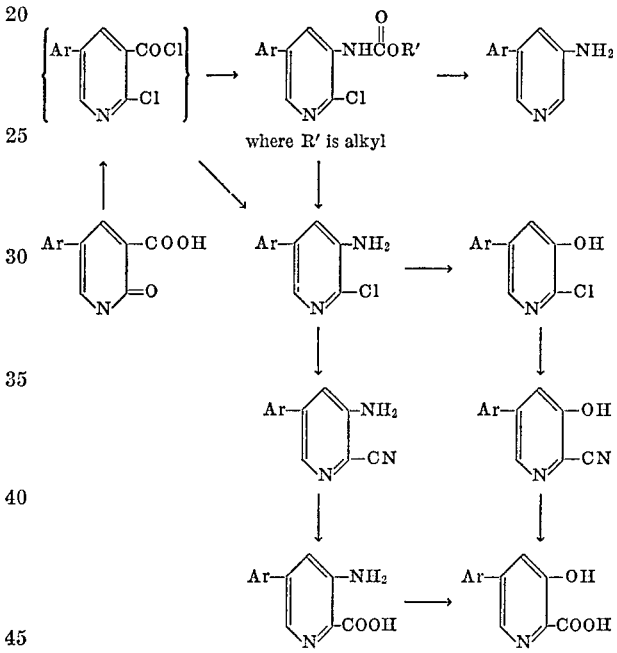

The 5-aryl-3-hydroxypicolinic acids can be easily converted to the corresponding esters and amides by conventional methods. The 3-hydroxy group can also be converted to the desired derivative by conventional methods.

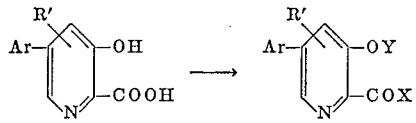

(C) 6-aryl-3-hydroxypicolinic acids

When 2-amino-5-nitropyridine is subjected to a modified Gomberg-Bachmann reaction with a substituted benzene compound and then catalytically reduced, a 6-aryl-3-aminopyridine is prepared. Diazotization to the pyridinol, followed by carboxylation under increased pressure, results in 6-aryl-3-hydroxypicolinic acid (Examples 20–23).

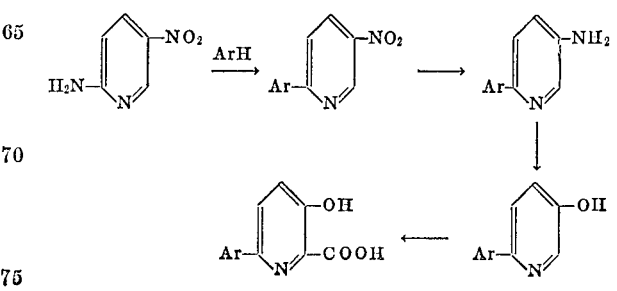

The 6-aryl-3-pyridinols may further be reacted with a basic formaldehyde media to the 6-aryl-3-hydroxy-2-hydroxymethylpyridine which, in turn, is oxidized to the 6-aryl-3-hydroxypicolinic acid (Examples 24–25). The 3-hydroxy group may be protected by forming the benzyloxy derivative which is then removed by reduction.

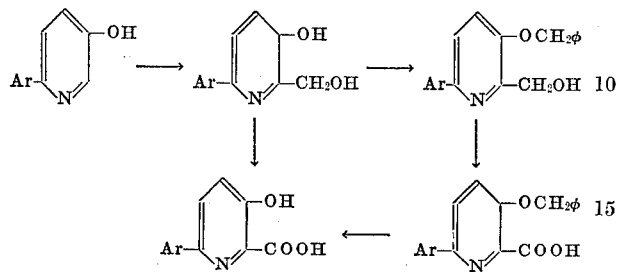

Condensation of arylmethylketones, 2-alkyl-1-buten-3-yne and ammonia, followed by permanganate oxidation of the isolated 6-aryl-2,3-dialkylpyridines, gives the corresponding 6-arylquinolinic acids. After preparing the ammonium salt of the quinolinic acid and heating with an anhydride, the 6-aryl quinolinimide is formed. This is then converted to the 3-amino-6-arylpicolinic acid by treatment with an alkaline solution of a metal hypobromite and diazotized to the 6-aryl-3-hydroxypicolinic acid (Examples 26–29).

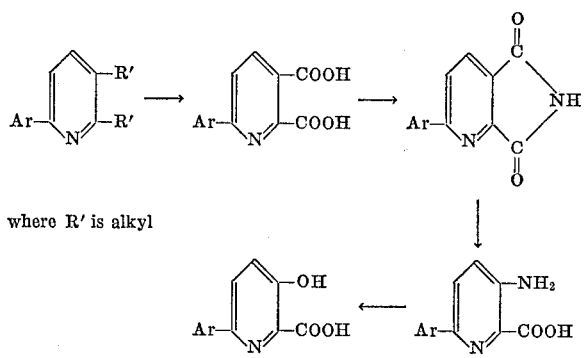

Chlorination of 6-aryl-2-hydroxynicotinic acid with a phosphorus oxychloride-phosphorus pentachloride mixture and treatment of the intermediate 6-aryl-2-chloronicotinic acid chloride with an absolute alkanol produces the alkyl 6-aryl-2-chloronicotinate. Dehalogenation of the 2-chloro group is accomplished catalytically. The amide is then prepared by reaction with ammonia. Treatment with an alkaline solution of a metal hypobromite, followed by diazotization affords the 6-aryl-3-pyridinol which is converted as above to the desired 6-aryl-3-hydroxypicolinic acid (Examples 30, 31, 39, 40 and 22–25).

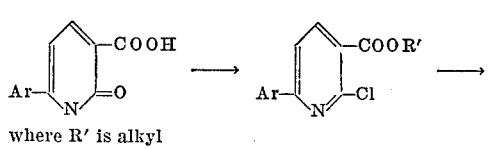

where R' is alkyl

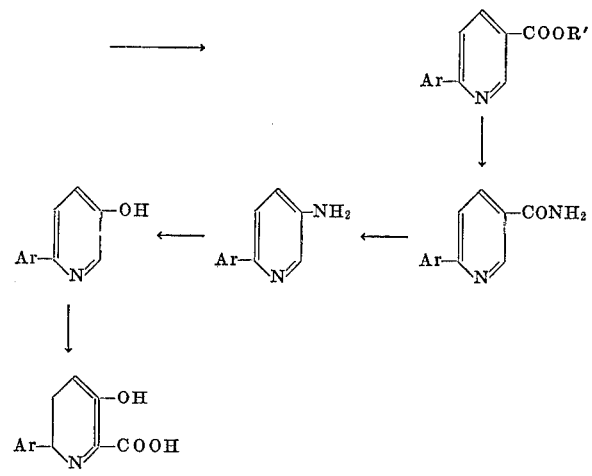

A further method of preparing the 6-arylnicotinates is by reacting an aryllithium compound with nicotine or 3-picoline. The 6-arylnicotine or 6-aryl-3-picoline is separated from its isomer, and then oxidized to the 6-arylnicotinic acid which is then esterified (Examples 32–34).

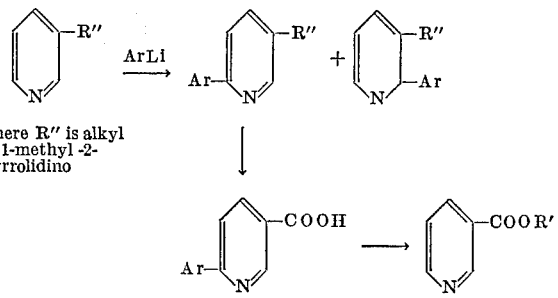

where R" is alkyl or 1-methyl-2-pyrrolidino where R' is alkyl

The 6-arylnicotinates are still further prepared by the condensation of hydroxymethyleneacetophenones with ammonia, followed by treatment with hydroxylamine to obtain 5-aroyl-2-arylpyridine oximes. Treatment with phosphorus pentachloride results in rearrangement to the N-aryl-6-arylnicotinamides which are hydrolyzed to the 6-arylnicotinic acids with acid and esterified (Examples 35–37 and 34).

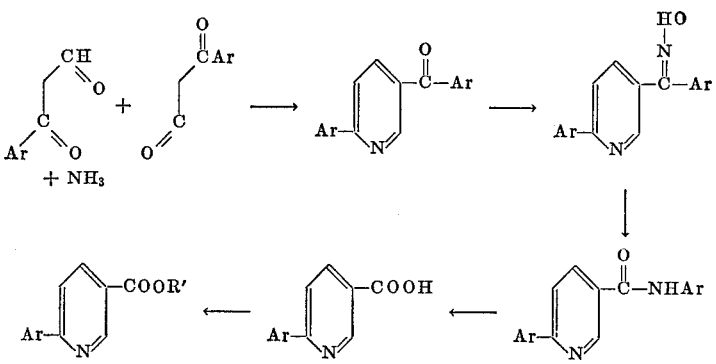

where R' is alkyl.

The condensation of 3-chloroacrylophenones with alkyl β-aminocrotonate results in alkyl 6-aryl-2-methylnicotinates (Example 38).

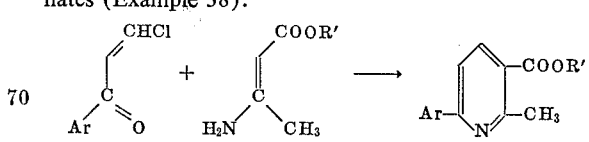

where R' is alkyl.

Treatment of 6-aryl-2-hydroxynicotinic acids with a phosphorus oxychloride-phosphorus pentachloride mixture, followed by reacting with a metal azide and acidifying, gives 3-amino-6-aryl-2-chloropyridine. Reaction with copper cyanide results in the 3-amino-6-aryl-2-cyanopyridine which is hydrolyzed to the picolinic acid and diazotized to the 6-aryl-3-hydroxypicolinic acid as above (Examples 41–43 and 29).

Following the reaction of the 6-aryl-2-chloronicotinic acid chloride with a metal azide as above, the reaction mixture may be treated with an absolute alcohol to give the corresponding urethan derivative of 3-amino-6-aryl-2-chloropyridine, which can then be hydrolyzed and dehalogenated to give the corresponding 3-amino-6-arylpyridine.

The 3-amino-6-aryl-2-chloropyridines may also be first diazotized to the 3-hydroxy compounds and then converted to the 6-aryl-2-cyano-3-hydroxypyridines which are hydrolyzed to the desired picolinic acids (Examples 22, 42, 43 and 29).

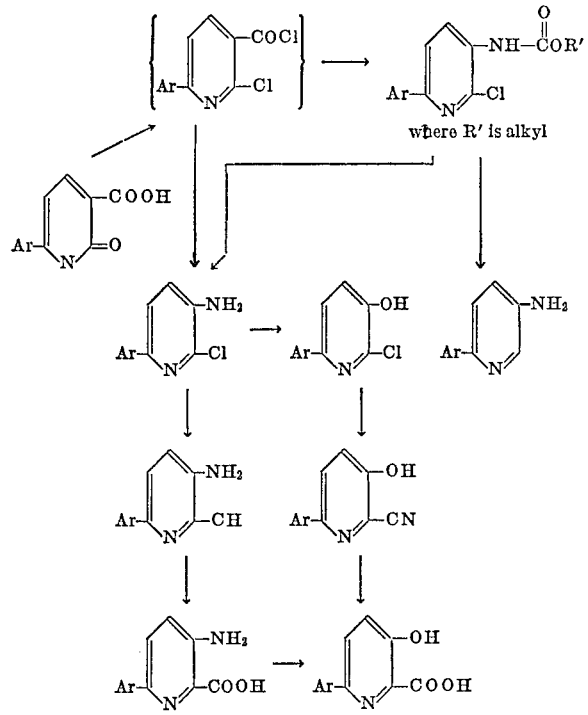

5-arylfurfurals form cyanohydrins with potassium cyanide in acid media, and these, when treated with urea, give α-ureido-2-(5-arylfuran)acetonitriles. Rearrangement and ring closure is accomplished with chlorine in hydrochloric acid media and results in 6-aryl-3-hydroxypicolinamides and picolinonitriles which are then hydrolyzed with acid to give 6-aryl-3-hydroxypicolinic acids (Examples 44 and 45).

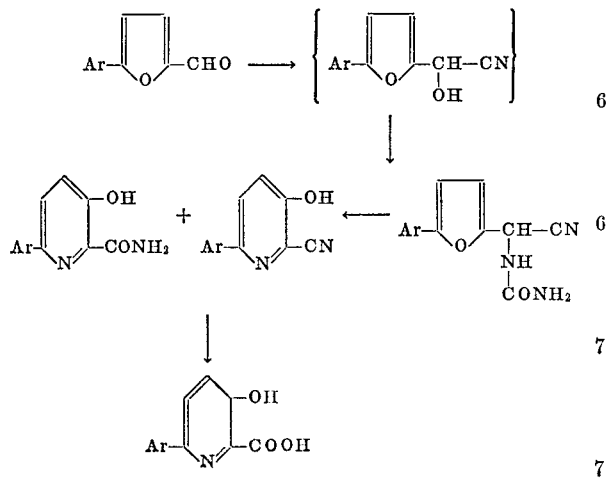

A further route from furans is the reaction of 2-acyl-5-arylfurans with ammonia to give the corresponding 2-alkyl-6-aryl-3-pyridinols. Permanganate oxidation results in 6-aryl-3-hydroxypicolinic acids.

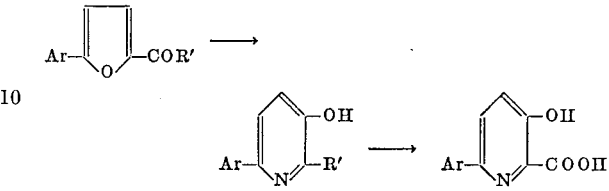

where R' is alkyl.

When 3-bromo-6-amino-2-picoline is diazotized in the presence of a substituted benzene and the resulting 6-aryl-3-bromo-2-picoline is oxidized, the product is 6-aryl-3-bromopicolinic acid. Treatment with base yields the desired 6-aryl-3-hydroxypicolinic acid (Examples 20, 46 and 19).

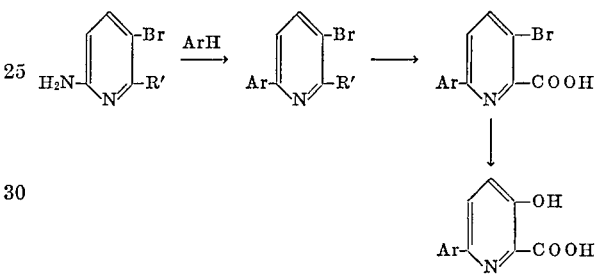

where R' is alkyl.

The 6-aryl-3-hydroxypicolinic acids can be easily converted to the corresponding esters and amides by conventional methods. The 3-hydroxy group can also be converted to the desired derivative by conventional methods.

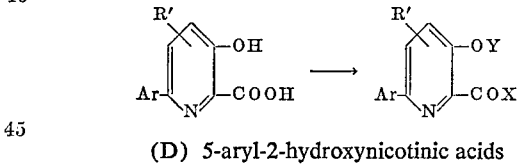

(D) 5-aryl-2-hydroxynicotinic acids

When a substituted phenylacetic acid is reacted with phosphorus oxychloride in the presence of dimethylformamide, a 3-dimethylamino-2-arylacrolein is prepared. Upon treatment with cyanoacetamide in a metal alkoxide medium, the 5-aryl-2-hydroxynicotinonitrile results. This is then hydrolyzed to the 5-aryl-2-hydroxynicotinic acid (Examples 47, 48 and 51).

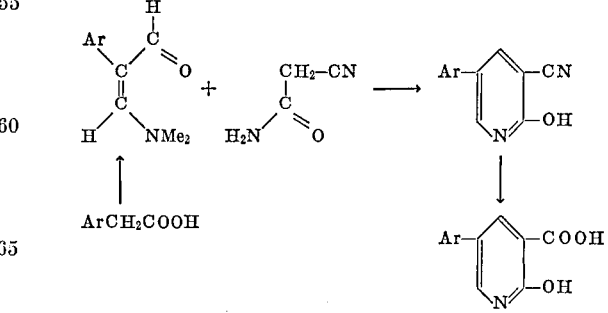

Condensation of a 1-aryl-2-propanone with a formic acid ester occurs in the presence of a metal alkoxide and results in a 2-arylacetoacetaldehyde. The 2-arylacetoacetaldehyde is then reacted with an alkylcyanoacetate or cyanoacetamide in a basic (preferably a secondary amine) medium to form an alkyl 6-alkyl-5-aryl-2-hydroxynicotinate or a 6-alkyl-5-aryl-2-hydroxynicotinonitrile. Hydrolysis of the esters and nitriles results in 6-alkyl-5-aryl-2-hydroxynicotinic acids (Examples 49–51).

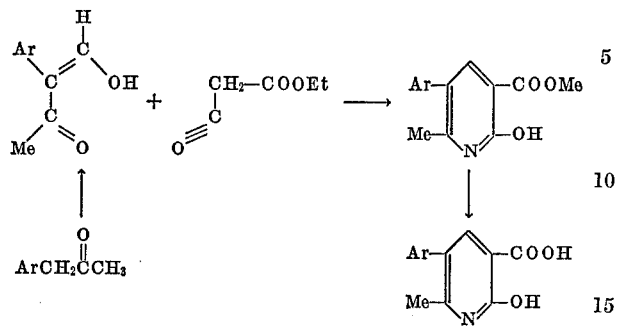

A further condensation involves an α-aryl-β-alkoxy-acrylonitrile derivative and cyanoacetamide, which under metal alkoxide conditions affords a 6-amino-4-alkyl-5-aryl-2-hydroxynicotinonitrile. These compounds are then converted to the 6-chloro-4-alkyl-5-aryl-2-hydroxynicotinic acids. Catalytic dehalogenation of the 6-chloro group is then easily accomplished to obtain the 4-alkyl-5-aryl-2-hydroxynicotinic acids (Examples 52–55).

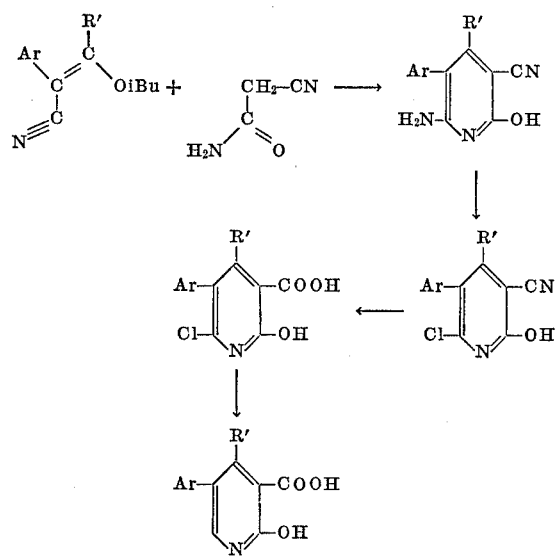

Conversion of the 5-aryl-2-hydroxynicotinic acids to the corresponding esters and amides is easily carried out by conventional methods as is the conversion of the 2-hydroxy group to the desired derivative.

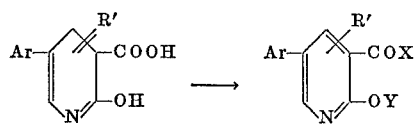

(E) 6-aryl-2-hydroxynicotinic acids

Aroylacetaldehydes react with cyanoacetamide in basic media to obtain 6-aryl-2-hydroxynicotinonitriles. Hydrolysis of the nitrile affords the desired 6-aryl-2-hydroxynicotinic acid.

This preparation can also be carried out using the corresponding metal salts or acetals (a) of the aroylacetaldehydes as well as with the appropriate 2-aroyl aliphatic aldehydes, (b) or 1-aryl-1,3-diketones (c) to obtain 6-aryl-2-hydroxynicotinonitriles, 5-alkyl-6-aryl-2-hydroxynicotinonitriles, or 4-alkyl-6-aryl-2-hydroxynicotinonitriles, respectively.

If cyanoacetamide is replaced by an alkyl cyanoacetate, then the product obtained is the corresponding 6-aryl-2-hydroxynicotinic acid ester. Hydrolysis gives the desired acid (Examples 56 and 51).

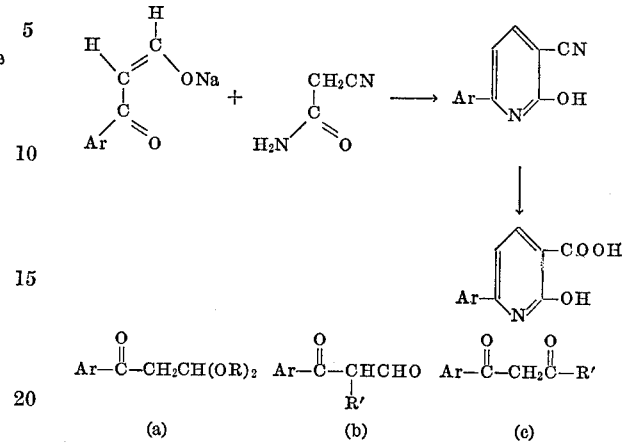

where R, R'=alkyl.

When the cyanoacetamide is replaced by ethyl α-carboethoxyacetimidate or by malonamidamidine, 2-amino-6-arylnicotinic acid ethyl esters or 2-amino-6-arylnicotinamides, respectively, are prepared. Hydrolysis of the esters or amides results in 2-amino-6-arylnicotinic acids which are then diazotized to the 6-aryl-2-hydroxynicotinic acids by sodium nitrite in sulfuric acid (Examples 57, 51 and 58).

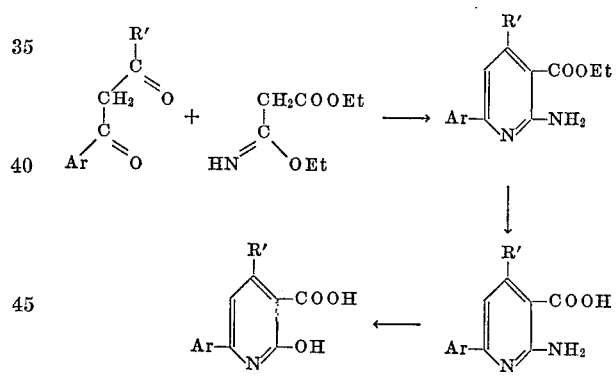

Reaction of an aryl lithium with a methoxy-substituted quinoline, followed by oxidation with permanganate of the resulting 2-arylmethoxy quinoline, yields the desired 6-aryl-2-hydroxynicotinic acid (Examples 59 and 60).

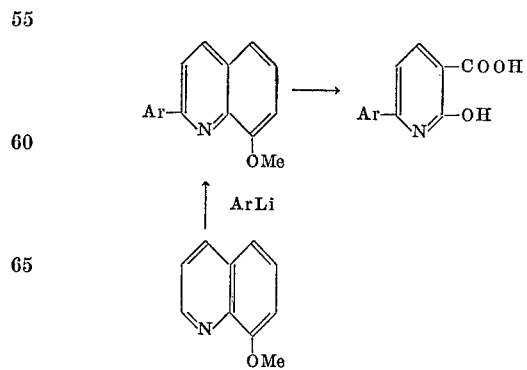

When a 6-arylquinolinic acid is converted to the anhydride and then reacted with ammonia, the α-monoamide is prepared. This is converted to the 6-aryl-2-aminonicotinic acid by treatment with an alkaline solution of a metal hypobromite. This is then diazotized to the 6-aryl-2-hydroxynicotinic acid (Example 61).

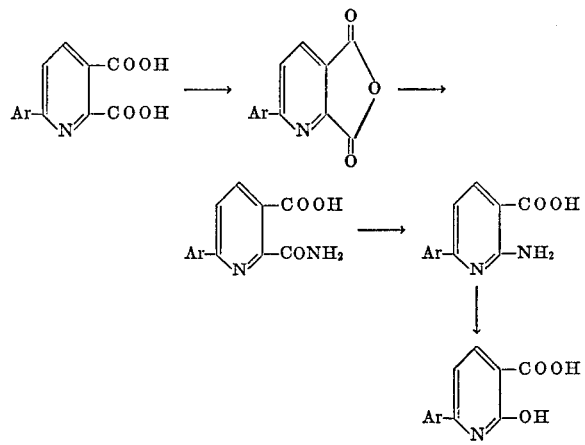

Treatment of 6-arylnicotinic acids with peroxide gives the N-oxides, and subsequent chlorination with a phosphorus pentachloride-phosphorus oxychloride mixture gives mixtures of 2- and 4-chloro-6-arylnicotinic acids. The former can then be hydrolyzed to the desired 6-aryl-2-hydroxynicotinic acids (Examples 62 and 63).

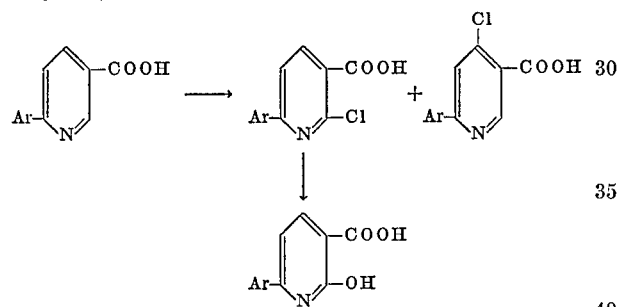

The 6-arylnicotinic acid N-oxides undergo rearrangement is in alkanoic anhydride to give the 6-aryl-2-hydroxynicotinic acids.

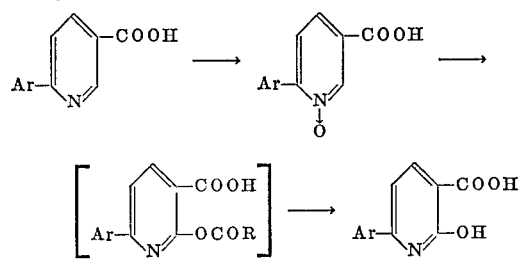

The corresponding 6-aryl-2-pyrone-3-carboxylates may be converted with alcoholic ammonia to the 6-aryl-2-hydroxynicotinates.

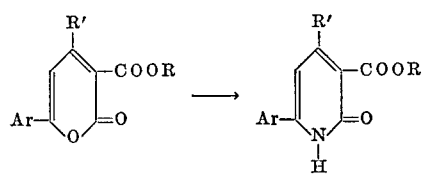

6-aryl-2-halo- or acylamino-3-picolines may be oxidized to the corresponding nicotinic acids, and these treated further as outlined above to give the 6-aryl-2-hydroxynicotinic acids.

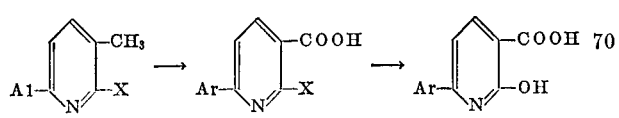

Conversion of the 6-aryl-2-hydroxynicotinic acids to the corresponding esters and amides is carried out by conventional methods, as is the conversion of the 2-hydroxy group to the desired derivative.

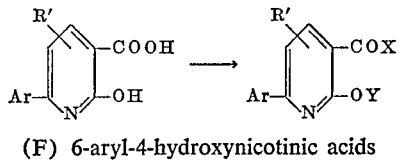

(F) 6-aryl-4-hydroxynicotinic acids 6-aryl-4-chloronicotinic acids are easily hydrolyzed under aqueous conditions to 6-aryl-4-hydroxynicotinic acids (Examples 62 and 63).

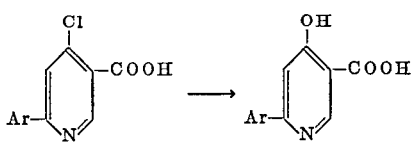

An aroylacetoacetaldehyde is obtained by aroylation of the dicarbanion prepared from a metal acetoacetaldehyde and a metal amide in liquid ammonia. When this diketoaldehyde is reacted with alcoholic ammonia, the 2-aryl-4-pyridinol results. Treatment of the metal salts of these compounds with carbon dioxide at increased pressures gives the desired 6-aryl-4-hydroxynicotinic acids (Examples 64–65).

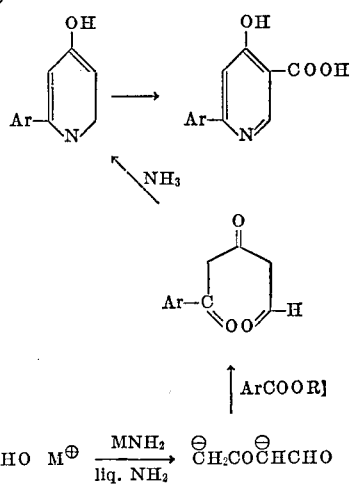

When 6-arylcinchomeronic acids are converted to the anhydrides and then reacted with ammonia, the γ-monoamides are prepared. These are then converted to the 6-aryl-4-aminonicotinic acids by treatment with an alkaline solution of a metal hypobromite, and then diazotized to the 6-aryl-4-hydroxynicotinic acids (Example 66).

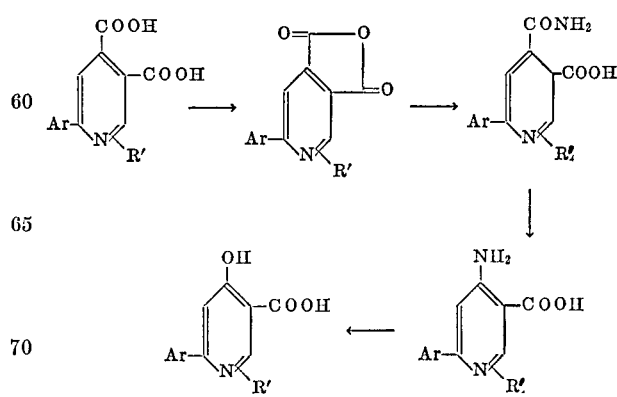

A further method of preparation involves oxidation by nitric acid of 2-aryl-7-hydroxy-4-quinolones, and subsequent decarboxylation, to give the corresponding 6-aryl-4-hydroxynicotinic acids.

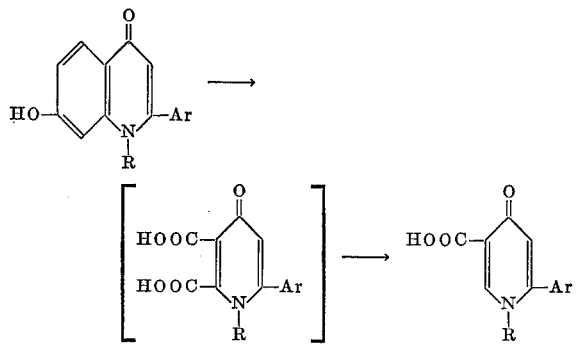

4-amino-6-aryl - 3 - picolines, which are suitably protected, are oxidized to the corresponding nicotinic acids. Hydrolysis and diazotization result in the 6-aryl-4-hydroxynicotinic acids.

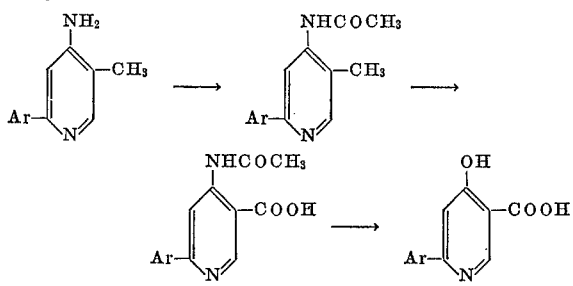

Conversion of the 6 - aryl - 4 - hydroxynicotinic acids to the corresponding esters and amides is easily carried out by conventional methods as is the conversion of the 4-hydroxy group to the desired derivative.

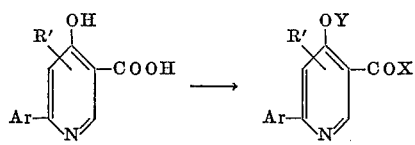

When an R' substituent is desired in the final product, the corresponding starting material is used which would produce the desired R' group substituted in the proper position.

The starting materials of this invention are either known compounds or the method of preparing them has been incorporated into the appropriate example.

The following are detailed examples which show the preparation of the various compounds described in this invention. They are to be construed as illustrations of said compounds and not as limitations thereof.

EXAMPLE 1

Ethyl p-fluorobenzoylpyruvate

A solution of sodium (2.3 g., 0.10 g.-atom) in absolute ethanol (25 ml.) is treated slowly, and with stirring, with a mixture of diethyl oxalate (14.6 g., 0.10 mole) and p-fluoroacetophenone (13.8 g., 0.10 mole) below 5° (ice-salt bath); additional ethanol is also added as necessary to promote facile stirring. When the addition is complete, the cooling bath is removed, and the mixture is stirred overnight at room temperature.

The cooling bath is replaced, and the chilled solution is acidified with 20% sulfuric acid to pH 1–2. The mixture is filtered, and the filtrate is diluted with water (50 ml.), and extracted with benzene (3× 25 ml.). The combined extracts are washed to neutrality with 10% aqueous sodium bicarbonate and water, dried over anhydrous sodium sulfate, and evaporated in vacuo. Ethyl p-fluorobenzoylpyruvate is obtained by distillation of the residue in vacuo.

When the arylmethyl ketones of Table I below are used in place of p-fluoroacetophenone in the above example, the corresponding aroylpyruvic ester of Table II below is obtained.

Table I acetophenone
o-methylacetophenone
p-t-butylacetophenone
p-allylacetophenone
p-chloroacetophenone
2,3,4,5,6-pentafluoroacetophenone
p-trifluoromethylacetophenone
p-methoxyacetophenone
3,4,5-trimethoxyacetophenone
p-nitroacetophenone
α-naphthyl methyl ketone
p-fluorophenyl ethyl ketone Table II ethyl benzoylpyruvate
ethyl o-methylbenzoylpyruvate
ethyl p-t-butylbenzoylpyruvate
ethyl p-allylbenzoylpyruvate
ethyl p-chlorobenzoylpyruvate
ethyl 2,3,4,5,6-pentafluorobenzoylpyruvate
ethyl p-trifluoromethylbenzoylpyruvate
ethyl p-methoxybenzoylpyruvate
ethyl 3,4,5-trimethoxybenzoylpyruvate
ethyl p-nitrobenzoylpyruvate
ethyl α-naphthoylpyruvate
ethyl α-methyl-α-(p-fluorobenzoyl) pyruvate

EXAMPLE 2

4-carboethoxy-3-cyano-6-(p-fluorophenyl)-2[1H]-pyridone

A solution of ethyl p-fluorobenzoylpyruvate (23.8 g., 0.10 mole) and cyanoacetamide (8.4 g., 0.10 mole) in absolute ethanol (120 ml.) is warmed to 60° and treated with piperidine (3.2 ml.) dropwise at such a rate as to maintain the temperature near 75°. When the addition is complete, the mixture is kept at 60–70° for one hour, and then is chilled thoroughly. 4-carboethoxy-3-cyano-6-(p-fluorophenyl)-2[1H]-pyridone is collected by filtration and washed thoroughly with cold ethanol.

When the ethyl aroylpyruvates of Table II, Example 1, are used in the above example in place of ethyl p-fluorobenzoylpyruvate, the corresponding 6-aryl-4-carboethoxy-3-cyano-2[1H]-pyridones of Table I below are prepared.

Table I 4-carboethoxy-3-cyano-6-phenyl-2[1H]-pyridone
4-carboethoxy-3-cyano-6-(o-methylphenyl)-2[1H]-pyridone
4-carboethoxy-3-cyano-6-(p-t-butylphenyl)-2[1H]-pyridone
4-carboethoxy-3-cyano-6-(p-allylphenyl)-2[1H]-pyridone
4-carboethoxy-3-cyano-6-(p-chlorophenyl)-2[1H]-pyridone
4-carboethoxy-3-cyano-6-(2,3,4,5,6-pentafluorophenyl)-2[1H]-pyridone
4-carboethoxy-3-cyano-6-(p-trifluoromethylphenyl)-2[1H]-pyridone
4-carboethoxy-3-cyano-6-(p-methoxyphenyl)-2[1H]-pyridone
4-carboethoxy-3-cyano-6-(3,4,5-trimethoxyphenyl)-2[1H]-pyridone
4-carboethoxy-3-cyano-6-(p-nitrophenyl)-2[1H]-pyridone
4-carboethoxy-3-cyano-6-(α-naphthyl)-2[1H]-pyridone
4-carboethoxy-3-cyano-5-methyl-6-(p-fluorophenyl)-2[1H]-pyridone

EXAMPLE 3

Ethyl 2-chloro-3-cyano-6-(p-fluorophenyl)-isonicotinate

4 - Carboethoxy - 3 - cyano - 6 - (p-fluorophenyl-2[1H]-pyridone (14.3 g., 0.05 mole) is treated with phosphorus oxychloride (20 g., 0.13 mole). To the mixture, finely-pulverized phosphorus pentachloride (21 g., 0.10 mole) is added in small portions. Once the evolution of hydrogen chloride has subsided, the mixture is warmed on the steam-bath for one hour.

Excess phosphorus oxychloride is removed by evaporation in vacuo, and the residual syrup is poured onto cracked ice (ca. 50 g.). The mixture is extracted with chloroform (3× 50 ml.), the combined extracts washed with water, dried over anhydrous sodium sulfate, filtered and evaporated to give ethyl 2-chloro-3-cyano-6-(p-fluorophenyl)isonicotinate.

When the 6-aryl - 4 - carboethoxy-3-cyano-2[1H]-pyridones of Table I, Example 2, are used in place of 4-carboethoxy-3-cyano-6-(p-fluorophenyl-2[1H]-pyridone in the above example, the corresponding 6-aryl - 2 - chloro-3-cyanoisonicotinic acid ethyl esters of Table I below are prepared.

Table I ethyl 2-chloro-3-cyano-6-phenylisonicotinate
ethyl 2-chloro-3-cyano-6-(o-methylphenyl)isonicotinate
ethyl 2-chloro-3-cyano-6-(p-t-butylphenyl)isonicotinate
ethyl 2-chloro-3-cyano-6-(p-allylphenyl)isonicotinate
ethyl 2-chloro-3-cyano-6-(p-chlorophenyl)isonicotinate
ethyl 2-chloro-3-cyano-6-(2,3,4,5,6-pentafluorophenyl)-isonicotinate
ethyl 2-chloro-3-cyano-6-(p-trifluoromethylphenyl)-isonicotinate
ethyl 2-chloro-3-cyano-6-(p-methoxyphenyl)isonicotinate
ethyl 2-chloro-3-cyano-6-(3,4,5-trimethoxyphenyl)-isonicotinate
ethyl 2-chloro-3-cyano-6-(p-nitrophenyl)isonicotinate
ethyl 2-chloro-3-cyano-6-(α-naphthyl)isonicotinate
ethyl 2-chloro-3-cyano-5-methyl-6-(p-fluorophenyl)-isonicotinate

EXAMPLE 4

Ethyl 5-cyano-2-(p-fluorophenyl)isonicotinate

Ethyl 2-chloro-3-cyano-6-(p-fluorophenyl)isonicotinate (3.0 g., 0.010 mole) and 5% palladium-on-barium carbonate (6 g.) are suspended in absolute ethanol (200 ml.), and shaken with hydrogen gas at atmospheric pressure until the calculated amount of hydrogen is taken up.

The catalyst is removed by filtration, and washed thoroughly with ethanol. Evaporation of the combined filtrate and washings in vacuo gives ethyl 5-cyano-2-(p-fluorophenyl)isonicotinate.

When the ethyl 6-aryl-2-chloro-3-cyanoisonicotinates of Table I, Example 3, are used in place of ethyl 2-chloro-3 - cyano-6-(p-fluorophenyl)isonicotinate in the above example, the corresponding ethyl 2-aryl-5-cyanoisonicotinates of Table I below are prepared.

Table I ethyl 5-cyano-2-phenylisonicotinate
ethyl 5-cyano-2-(o-methylphenyl)isonicotinate
ethyl 5-cyano-2-(p-t-butylphenyl)isonicotinate
ethyl 5-cyano-2-(p-n-propyl phenyl)isonicotinate
ethyl 5-cyano-2-(p-chlorophenyl)isonicotinate
ethyl 5-cyano-2-(2,3,4,5,6-pentafluorophenyl)-isonicotinate
ethyl 5-cyano-2-(p-trifluoromethylphenyl)-isonicotinate
ethyl 5-cyano-2-(p-methoxyphenyl)isonicotinate
ethyl 5-cyano-2-(3,4,5-trimethoxyphenyl)-isonicotinate
ethyl 5-cyano-2-(p-amino phenyl)isonicotinate
ethyl 5-cyano-2-(α-naphthyliso)nicotinate
ethyl-5-cyano-3-methyl-2-(p-fluorophenyl)isonicotinate

EXAMPLE 5

6-(p-fluorophenyl)cinchomeronimide α-imine

Ethyl 5-cyano-2-(p-fluorophenyl)isonicotinate (2.7 g., 0.010 mole) is stirred with concentrated aqueous ammonia (80 ml.) at 0° for three hours.

The 6-(p-fluorophenyl)cinchomeronimide α-imine is collected by filtration, and purified by recrystallization from ethanol or dioxane.

When the ethyl 2-aryl-5-cyanoisonicotinates of Table I, Example 4, are used in place of ethyl 5-cyano-2-(p-fluorophenyl)isonicotinate in the above example, the corresponding 6-arylcinchomeronimide α-imines of Table I below are prepared.

Table I 6-phenylcinchomeronimide α-imine
6-(o-methylphenyl)cinchomeronimide α-imine
6-(p-t-butylphenyl)cinchomeronimide α-imine
6-(p-n-propylphenyl)cinchomeronimide α-imine
6-(p-chlorophenyl)cinchomeronimide α-imine
6-(2,3,4,5,6-pentafluorophenyl)cinchomeronimide α-imine
6-(p-trifluoromethylphenyl)cinchomeronimide α-imine
6-(p-methoxyphenyl)cinchomeronimide α-imine
6-(3,4,5-trimethoxyphenyl)cinchomeronimide α-imine
6-(p-aminophenyl)cinchomeronimide α-imine
6-(α-naphthyl)cinchomeronimide α-imine
5-methyl-6-(p-fluorophenyl)cinchomeronimide α-imine

EXAMPLE 6

6-(p-fluorophenyl)cinchomeronimide 6-p-fluorophenyl)cinchomeronimide α-imine (600 mg., 2.5 mmoles) is dissolved in 0.1 N hydrochloric acid (30 ml.) at room temperature. The solution is then cooled in an ice-bath, and kept at 0° for three hours.

6-(p-fluorophenyl)cinchomeronimide is collected by filtration and washed thoroughly with cold water.

When the 6-aryl-cinchomeronimide α-imines of Table I, Example 5, are used in place of 6-(p-fluorophenyl)cinchomeronimide α-imine in the above example, the corresponding 6-aryl-cinchomeronimides of Table I below are obtained.

Table I 6-phenyl cinchomeronimide
6-(o-methylphenyl)cinchomeronimide
6-(p-t-butylphenyl)cinchomeronimide
6-(p-n-propylphenyl)cinchomeronimide
6-(p-chlorophenyl)cinchomeronimide
6-(2,3,4,5,6-pentafluorophenyl)cinchomeronimide
6-(p-trifluoromethylphenyl)cinchomeronimide
6-(p-methoxyphenyl)cinchomeronimide
6-(3,4,5-trimethoxyphenyl)cinchomeronimide
6-(p-aminophenyl)cinchomeronimide
6-(α-naphthyl)cinchomeronimide
5-methyl-6-(p-fluorophenyl)cinchomeronimide

EXAMPLE 7

6-(p-fluorophenyl)cinchomeronic acid

Ethyl 5-cyano-2-(p-fluorophenyl)isonicotinate (6.8 g., 0.025 mole) is heated under reflux with aqueous 15% sodium hydroxide (30 ml.) until evolution of ammonia ceases (ca. 3 hours).

The solution is acidified to Congo-red with 25% nitric acid, and chilled thoroughly. 6-(p-fluorophenyl)cinchomeronic acid is collected by filtration, and washed thoroughly with cold water.

When the 2-aryl-5-cyano-isonicotinic acid ethyl esters of Table I, Example 4, are used in the above example in place of ethyl 5-cyano-2-(p-fluorophenyl)isonicotinate, the corresponding 6-aryl-cinchomeronic acids of Table I below are obtained.

Table I 6-phenyl cinchomeronic acid
6-(o-methylphenyl)cinchomeronic acid
6-(p-t-butylphenyl)cinchomeronic acid
6-(p-n-propylphenyl)cinchomeronic acid
6-(p-chlorophenyl)cinchomeronic acid
6-(2,3,4,5,6-pentafluorophenyl)cinchomeronic acid
6-(p-trifluoromethylphenyl)cinchomeronic acid
6-(p-methoxyphenyl)cinchomeronic acid
6-(3,4,5-trimethoxyphenyl)cinchomeronic acid
6-(p-aminophenyl)cinchomeronic acid
6-(α-naphthyl)cinchomeronic acid
5-methyl-6-(p-fluorophenyl)cinchomeronic acid

EXAMPLE 8

6-(p-fluorophenyl)-2-methyl cinchomeronic acid (A) A solution of ethyl p-fluorobenzoylpyruvate (23.8 g., 0.10 mole) and ethyl 3-aminocrotonate (12.9 g., 0.10 mole) in ether (40 ml.) is kept at 0° for 24 hours and at room temperature for an additional 24 hours.

The solvent is then removed in vacuo, and the residual addition product is heated at 130° for one hour; smooth separation of water occurs. The residue is cooled and crystallized from ethanol giving ethyl 6-(p-fluorophenyl)-2-methyl cinchomeronate.

(B) The ester is hydrolyzed by refluxing with excess methanolic 10% potassium hydroxide for two hours. The solvent is removed by evaporation in vacuo, and replaced by an equivalent quantity of water. The aqueous solution is acidified to Congo-red with hydrochloric acid, giving 6-(p-fluorophenyl)-2-methylcinchomeronic acid.

Ethyl p-fluorobenzoylpyruvate may be replaced in the above example by any of the aroylpyruvic acid ethyl esters of Table II, Example 1; the corresponding 6-aryl-2-methylcinchomeronic acids of Table I below are thereby obtained.

Table I 2-methyl-6-phenylcinchomeronic acid
2-methyl-6-(o-methylphenyl)cinchomeronic acid
2-methyl-6-(p-t-butylphenyl)cinchomeronic acid
2-methyl-6-(p-allylphenyl)cinchomeronic acid
2-methyl-6-(p-chlorophenyl)cinchomeronic acid
2-methyl-6-(2,3,4,5,6-pentafluorophenyl)cinchomeronic acid
2-methyl-6-(p-trifluoromethylphenyl)cinchomeronic acid
2-methyl-6-(p-methoxyphenyl)cinchomeronic acid
2-methyl-6-(3,4,5-trimethoxyphenyl)cinchomeronic acid
2-methyl-6-(p-nitrophenyl)cinchomeronic acid
2-methyl-6-(α-naphthyl)cinchomeronic acid
2,5-dimethyl-6-(p-fluorophenyl)cinchomeronic acid Ethyl 3-aminocrotonate may be replaced in the above example by any of the derivatives of β-aminoacrylic acid of Table II below [which are prepared by the procedure outlined by R. Lukes and J. Kloubek, Collection Czechoslov Chem. Communs, 25, 607 (1960) (C.A. 54:11984d)]; the corresponding 2 - alkyl - 6-aryl-cinchomeronic acids of Table III below are thereby obtained.

Table II ethyl β-ethyl-β-aminoacrylate
ethyl β-propyl-β-aminoacrylate
ethyl-β-butyl-β-aminoacrylate
ethyl β-isobutyl-β-aminoacrylate

Table III 6-(p-fluorophenyl-2-ethylcinchomeronic acid
6-(p-fluorophenyl)-2-propylcinchomeronic acid
6-(p-fluorophenyl)-2-butycinchomeronic acid
6-(p-fluorophenyl)-2-isobutylcinchomeronic acid

EXAMPLE 9

Methyl 6-(p-fluorophenyl)cinchomeronate

Dry hydrogen chloride is passed into a refluxing solution of 6 - (p-fluorophenyl)cinchomeronic acid (5.2 g., 0.02 mole) in anhydrous methanol (60 ml.) for four hours.

The solvent is evaporated in vacuo, and the syrupy residue poured into excess aqueous 10% sodium bicarbonate. Methyl 6-(p-fluorophenyl)cinchomeronate is collected by filtration, and washed thoroughly with cold water.

When the 6-aryl-cinchomeronic acids of Table I, Example 7, or the 2 - alkyl-6-aryl cinchomeronic acids of Tables I and III, Example 8, are used in place of 6-(p-fluorophenyl)-cinchomeronic acid in the above example, the corresponding methyl esters are obtained.

EXAMPLE 10

6-(p-fluorophenyl)cinchomeronimide

A solution of methyl 6-(p-fluorophenyl)-cinchomeronate (4.3 g., 0.015 mole) in methanol (50 ml.) is saturated with ammonia at 0° and kept at 0° for three days. The precipitate of 6-(p-fluorophenyl)cinchomeronamide is collected by filtration, washed thoroughly with cold water, and dried.

The amide is heated at 225° until the evolution of ammonia ceases (ca. 10–15 minutes). The residue is cooled and crystallized from aqueous methanol, giving 6-(p-fluorophenyl)cinchomeronimide.

When the 6-aryl- or 2-alkyl-6-arylcinchomeronic acid methyl esters of Example 9, or the 2 - alkyl-6-aryl-cinchomeronic acid ethyl esters of Example 8 are used in place of methyl 6-(p-fluorophenyl)cinchomeronate in the above example, the corresponding substituted cinchomeronimides are obtained.

EXAMPLE 11

6-(p-fluorophenyl)-2-methylcinchomeronimide 6-(p-fluorophenyl)-2-methylcinchomeronic acid (5.5 g., 0.02 mole) is heated on the steam-bath for five hours with acetic anhydride (30 ml.). The solvent is removed under reduced pressure, and the residue is mixed with acetamide (5.9 g., 0.10 mole) and acetic anhydride (2 ml.) and heated at 125–130° for six hours to give 6-(p-fluorophenyl)-2-methylcinchomeronimide. After chilling, the product is transferred to a filter and washed thoroughly with acetic acid and water. It is purified by recrystallization from acetone or alcohol.

When the 6-arylcinchomeronic acids Example 7 or the 2-alkyl-6-arylcinchomeronic acids of Example 8 are used in place of 6-(p-fluorophenyl) - 2-methylcinchomeronic acid in the above example, the corresponding imides are obtained.

Table I 6-phenyl-2-methylcinchomeronimide
6-(o-methylphenyl)-2-methylcinchomeronimide
6-(p-t-butylphenyl)-2-methylcinchomeronimide
6-(p-allylphenyl)-2-methylcinchomeronimide
6-(p-chlorophenyl)-2-methylcinchomeronimide
6-(2,3,4,5,6-pentafluorophenyl)-2-methylcinchomeronimide
6-(p-trifluoromethylphenyl)-2-methylcinchomeronimide
6-(p-methoxyphenyl)-2-methylcinchomeronimide
6-(3,4,5-trimethoxyphenyl)-2-methylcinchomeronimide
6-(p-nitrophenyl)-2-methylcinchomeronimide
6-(α-naphthyl)-2-methylcinchomeronimide
6-(p-fluorophenyl)-2,5-dimethylcinchomeronimide
6-(p-fluorophenyl)-2-ethylcinchomeronimide
6-(p-fluorophenyl)-2-propylcinchomeronimide
6-(p-fluorophenyl)-2-butylcinchomeronimide
6-(p-fluorophenyl)-2-isobutylcinchomeronimide

EXAMPLE 12

2,4-dihydroxy-6-(p-fluorophenyl)copazoline

A solution of 6-(p-fluorophenyl)cinchomeronimide α-imine (6.0 g., 0.025 mole) in aqueous 10% potassium hydroxide (60 ml.) is treated with freshly prepared 1 N sodium hypochloride solution (25 ml.) and kept at 80° for 30 minutes. The solution is cooled, extracted with ether (2× 50 ml.), and acidified with acetic acid. The precipitate of 2,4-dihydroxy-6-(p-fluorophenyl)copazoline is collected by filtration and washed successively with water, ethanol, and ether.

When the 6-aryl-cinchomeronimide α-imines of Table I, Example 5, are used in place of 6-(p-fluorophenyl)-cinchomeronimide α-imine in the above example, the corresponding 6-aryl-2,4-dihydroxycopazolines of Table I below are obtained.

Table I 2,4-dihydroxy-6-phenylcopazoline
2,4-dihydroxy-6-(o-methylphenyl)copazoline
2,4-dihydroxy-6-(p-t-butylphenyl)copazoline
2,4-dihydroxy-6-(p-n-propylphenyl)copazoline
2,4-dihydroxy-6-(p-chlorophenyl)copazoline
2,4-dihydroxy-6-(2,3,4,5,6-pentafluorophenyl)copazoline
2,4-dihydroxy-6-(p-trifluoromethylphenyl)copazoline
2,4-dihydroxy-6-(p-methoxyphenyl)copazoline
2,4-dihydroxy-6-(3,4,5-trimethoxyphenyl)copazoline
2,4-dihydroxy-6-(p-aminophenyl)copazoline
2,4-dihydroxy-6-(α-naphthyl)copazoline
2,4-dihydroxy-6-(p-fluorophenyl)-5-methyl copazoline When 2-aryl-5-cyanoisonicotinamides are used in place of 6-arylcinchomeronimide α-imines in the above example, the corresponding 6-aryl - 2,4 - dihydroxycopazolines are obtained.

EXAMPLE 13

5-amino-2-(p-fluorophenyl)isonicotinic acid

A solution of 2,4-dihydroxy-6-(p-fluorophenyl)-copazoline (2.6 g., 0.010 mole) in aqueous 15% sodium hydroxide (10 ml.) is heated in an autoclave at 155° for two hours. The solution is cooled, and acidified to Congo-red with dilute hydrochloric acid. 5-amino-2-(p-fluorophenyl)isonicotinic acid is collected by filtration, and recrystallized from water.

When the 6-aryl-2,4-dihydroxycopazolines of Table I, Example 12, are used in place of 2,4-dihydroxy-6-(p-fluorophenyl)copazoline in the above example, the corresponding 5-amino-2-arylisonicotinic acids of Table I below are obtained.

Table I 5-amino-2-phenylisonicotinic acid.
5-amino-2-(o-methylphenyl)isonicotinic acid
5-amino-2-(p-t-butylphenyl)isonicotinic acid
5-amino-2-(p-n-propylphenyl)isonicotinic acid
5-amino-2-(p-chlorophenyl)isonicotinic acid
5-amino-2-(2,3,4,5,6-pentafluorophenyl)isonicotinic acid
5-amino-2-(p-trifluoromethylphenyl)isonicotinic acid
5-amino-2-(p-methoxyphenyl)isonicotinic acid
5-amino-2-(3,4,5-trimethoxyphenyl)isonicotinic acid
5-amino-2-(p-aminophenyl)isonicotinic acid
5-amino-2-(α-naphthyl)isonicotinic acid
5-amino-2-(p-fluorophenyl)-3-methyl-isonicotinic acid

EXAMPLE 14

3-amino-6-(p-fluorophenyl)-2-methylisonicotinic acid 6-(p-fluorophenyl-2-methylcinchomeronimide (2.6 g., 0.010 mole) is finely-powdered, and added at 0° to a stirred solution of bromine (1.8 g., 0.011 mole) and sodium hydroxide (2.4 g., 0.060 mole, in water (25 ml.). After 15 minutes, the mixture is warmed to 70–80° and held in that temperature range for one hour.

The reaction mixture is cooled, and acidified to Congo-red with hydrochloric acid. The solution is then evaporated to dryness in vacuo, and the residue extracted with ethanol (3× 40 ml.). The combined extracts are treated with 5 N hydrochloric acid (2.5 ml.), the solution evaporated to a volume of ca. 10 ml., and chilled thoroughly. 3-amino-6-(p-fluorophenyl)-2-methylisonicotinic acid hydrochloride is collected and recrystallized from 2 N hydrochloric acid.

When the 6-arylcinchomeronimides prepared in Examples 6, 10 and 11 or the 2-alkyl-6-aryl-cinchomeronimides prepared in Examples 10 and 11 are used in place of 6-(p-fluorophenyl)-2-methylcinchomeronimide in the above example, the corresponding 5-amino - 2 - arylisonicotinic acids or 3-amino-2-alkyl-6-aryl-isonicotinic acids, respectively, are obtained.

Table I 3-amino-6-phenyl-2-methylisonicotinic acid
3-amino-6-(o-methylphenyl)-2-methylisonicotinic acid
3-amino-6-(p-t-butylphenyl)-2-methylisonicotinic acid
3-amino-6-(p-allylphenyl)-2-methylisonicotinic acid
3-amino-6-(p-chlorophenyl)-2-methylisonicotinic acid
3-amino-6-(2,3,4,5,6-pentafluorophenyl-2-methylisonicotinic acid
3-amino-6-(p-trifluoromethylphenyl)-2-methylisonicotinic acid
3-amino-6-(p-methoxyphenyl)-2-methylisonicotinic acid
3-amino-6-(3,4,5-trimethoxyphenyl)-2-methylisonicotinic acid
3-amino-6-(p-nitrophenyl)-2-methylisonicotinic acid
3-amino-6-(α-naphthyl)-2-methylisonicotinic acid
3-amino-6-(p-fluorophenyl)-2,5-dimethylisonicotinic acid
3-amino-6-(p-fluorophenyl)-2-ethylisonicotinic acid
3-amino-6(p-fluorophenyl)-2-propylisonicotinic acid
3-amino-6-(p-fluorophenyl)-2-butylisonicotinic acid
3-amino-6-(p-fluorophenyl)-2-isobutylisonicotinic acid

EXAMPLE 15

2-(p-fluorophenyl)-5-hydroxyisonicotinic acid

To an ice-cold solution of 5-amino-2-(p-fluorophenyl) isonicotinic acid (4.6 g., 0.020 mole) in 2 N sulfuric acid (30 ml.) is added sodium nitrite (1.4 g., 0.020 mole). The mixture is allowed to warm to room temperature and then is heated on the steambath at ca. 60° until evolution of nitrogen ceases. The mixture is chilled thoroughly, and the 2-(p-fluorophenyl)5-hydroxyisonicotinic acid collected by filtration.

When the 5 - amino - 2 - arylisonicotinic -acids of Examples 13 and 14 or the 3-amino-2-alkyl-6-arylisonicotinic acids of Example 14 are used in place of 5-amino-2-(p-fluorophenyl)-isonicotinic acid in the above example, the corresponding hydroxy acids of Tables I and II, respectively, are obtained.

Table I 2-phenyl-5-hydroxyisonicotinic acid
2-(o-methylphenyl)-5-hydroxyisonicotinic acid
2-(p-t-butylphenyl-5-hydroxyisonicotinic aicd
2-(p-n-propylphenyl)-5-hydroxyisonicotinic acid
2-(p-chlorophenyl)-5-hydroxyisonicotinic acid
2-(2,3,4,5,6-pentafluorophenyl)-5-hydroxyisonicotinic acid
2-(p-trifluoromethylphenyl)-5-hydroxyisonicotinic acid
2-(p-methoxyphenyl)-5-hydroxyisonicotinic aicd
2-(3,4,5-trimethoxyphyenl)-5-hydroxyisonicotinic acid
2-(p-hydroxyphenyl)-5-hydroxyisonicotinic acid
2-(α-naphthyl)-5-hydroxyisonicotinic acid
2-(p-fluorophenyl)-3-methyl-5-hydroxyisonicotinic acid Table II 6-(p-fluorophenyl)-2-methyl-3-hydroxyisonicotinic acid
2-methyl-6-phenyl-3-hydroxyisonicotinic acid
2-methyl-6-(o-methylphenyl)-3-hydroxyisonicotinic acid
2-methyl-6-(p-t-butylphenyl)-3-hydroxyisonicotinic acid
2-methyl-6-(p-allylphenyl)-3-hydroxyisonicotinic acid
2-methyl-6-(p-chlorophenyl)-3-hydroxyisonicotinic acid
2-methyl-6-(2,3,4,5,6-pentafluorophenyl)-3-hydroxyisonicotinic acid
2-methyl-6-(p-trifluoromethylphenyl)-3-hydroxyisonicotinic acid
2-methyl-6-(p-methoxyphenyl)-3-hydroxyisonicotinic acid
2-methyl-6-(3,4,5-trimethoxyphenyl)-3-hydroxyisonicotinic acid 2-methyl-6-(p-nitrophenyl)-3-hydroxyisonicotinic acid
2-methyl-6-(α-naphthyl)-3-hydroxyisonicotinic acid
2,5-dimethyl-6-(p-fluorophenyl)-3-hydroxyisonicotinic acid
6-(p-fluorophenyl)-2-ethyl-3-hydroxyisonicotinic acid
6-(p-fluorophenyl)-2-propyl-3-hydroxyisonicotinic acid
6-(p-fluorophenyl)-2-butyl-3-hydroxyisonicotinic acid
6-(p-fluorophenyl)-2-isobutyl-3-hydroxyisonicotinic acid

EXAMPLE 16

5-bromo-2-phenyl-4-picoline

To a stirred solution of freshly-distilled isoamyl nitrite (35.1 g., 0.30 mole) in refluxing anhydrous benzene (450 ml.) is added dry, finely-powdered 2-amino-5-bromo-4-picoline [prepared by the procedure outline by H. Graboyes & A. R. Day, J. Am. Chem. Soc. 79, 6421 (1957).] (37.4 g., 0.20 mole) slowly in small aliquots. When the addition is complete, additional isoamyl nitrite (5 ml.) is added, and refluxing is continued until evolution of nitrogen ceases.

The reaction mixture is cooled and filtered, and the filtrate is evaporated in vacuo. The residue is taken up in petroleum ether, and the solution chromatographed on silica gel (2 kg.). Elution with petroleum ether-ether gives 5-bromo-2-phenyl-4-picoline.

When 2-amino-5-nitro-4-picoline [prepared by the procedure outlined by L. N. Pino and W. S. Zehrung, J. Am. Chem. Soc., 77, 3154 (1955)] is used in placed of 2-amino-5-bromo-4-picoline in the above example, the product obtained is 5-nitro-2-phenyl-4-picoline.

When the substituted benzenes of Table I below are used in place of benzene in the above example, the corresponding (o-, m- and p-substituted 2-phenyl)-5-bromo or 5-nitro-4-picolines of Table II below are obtained and separated by chromatography.

Table I
fluorobenzene
chlorobenzene
bromobenzene
anisole
ethoxybenzene
benzotrifluoride

Table II
2-(o-fluorophenyl)-5-bromo-4-picoline
2-(m-fluorophenyl)-5-bromo-4-picoline
2-(p-fluorophenyl)-5-bromo-4-picoline
2-(p-fluorophenyl)-5-nitro-4-picoline
2-(p-chlorophenyl)-5-bromo-4-picoline
2-(p-bromophenyl)-5-nitro-4-picoline
2-(p-methoxyphenyl)-5-bromo-4-picoline
2-(o-ethoxyphenyl)-5-bromo-4-picoline
2-(p-trifluoromethylphenyl)-5-bromo-4-picoline

EXAMPLE 17

5-bromo-2-phenylisonicotinic acid

A suspension of 5-bromo-2-phenyl-4-picoline (37.2 g., 0.15 mole) in water (1000 ml.) is stirred under reflux while a saturated solution of potassium permanganate (47.4 g., 0.30 mole) in water is added dropwise over ca. four hours.

The mixture is filtered hot, and the manganese dioxide filter cake is extracted thoroughly with hot water. The combined filtrates are evaporated to dryness in vacuo, the minimum quantity of water required to re-dissolve the residue is added, and the solution is acidified with hydrochloric acid. After thorough chilling, the 5-bromo-2-phenylisonicotinic acid is collected by filtration and washed thoroughly with cold water.

When the 2-aryl-5-bromo or 5-nitro-4-picolines of Table I, Example 16, are used in place of 5-bromo-2-phenyl-4-picoline in the above example, the corresponding 2-aryl-5-bromo or 5-nitroisonicotinic acids of Table I below are prepared.

Table I
2-phenyl-5-nitroisonicotinic acid
2-(o-fluorophenyl)-5-bromoisonicotinic acid
2-(m-fluorophenyl)-5-bromoisonicotinic acid
2-(p-fluorophenyl)-5-bromoisonicotinic acid
2-(p-fluorophenyl)-5-nitroisonicotinic acid
2-(p-chlorophenyl)-5-bromoisonicotinic acid
2-(p-bromophenyl)-5-nitroisonicotinic acid
2-(p-methoxyphenyl)-5-bromoisonicotinic acid
2-(o-ethoxyphenyl)-5-bromoisonicotinic acid
2-(p-trifluoromethylphenyl)-5-bromoisonicotinic acid

EXAMPLE 18

5-amino-2-phenylisonicotinic acid 5-nitro-2-phenylisonicotinic acid is hydrogenated in alcoholic solution in the presence of 10% palladium-charcoal catalyst to give 5-amino-2-phenylisonicotinic acid.

When 2-(p-fluorophenyl)-5-nitroisonicotinic acid and 2-(p-bromophenyl)-5-nitroisonicotinic acid are used in place of 5-nitro-2-phenylisonicotinic acid, the products obtained are 2-(p-fluorophenyl)-5-aminoisonicotinic acid and 2-(p-bromophenyl)-5-aminoisonicotinic acid, respectively.

The 5-amino-2-arylisonicotinic acids prepared above are converted to the corresponding 2-aryl-5-hydroxyisonicotinic acids according to the procedure of Example 15.

EXAMPLE 19

5-hydroxy-2-phenylisonicotinic acid

A solution of 5-bromo-2-phenylisonicotinic acid (27.8 g., 0.10 mole) and sodium hydroxide (34.0 g., 0.85 mole) in water (170 ml.) is treated with a solution of copper sulfate (200 mg.) in water (10 ml.), and the mixture is heated under reflux for 10 hours.

The mixture is cooled, filtered, and the filtrate acidified with hydrochloric acid. 5-hydroxy-2-phenylisonicotinic acid is collected by filtration, and washed thoroughly with cold water.

When 5-bromo-2-phenylisonicotinic acid is replaced in the above example by the 2-aryl-5-bromo-isonicotinic acids of Table I, Example 17, the corresponding 2-aryl-5-hydroxyisonicotinic acids of Table I below are obtained.

Table I
2-(o-fluorophenyl)-5-hydroxyisonicotinic acid
2-(m-fluorophenyl)-5-hydroxyisonicotinic acid
2-(p-fluorophenyl)-5-hydroxyisonicotinic acid
2-(p-chlorophenyl)-5-hydroxyisonicotinic acid
2-(p-methoxyphenyl)-5-hydroxyisonicotinic acid
2-(o-ethoxyphenyl)-5-hydroxyisonicotinic acid
2-(p-trifluoromethylphenyl)-5-hydroxyisonicotinic acid

EXAMPLE 20

3-nitro-5-phenylpyridine 3-amino-5-nitropyridine (27.8 g., 0.20 mole) [prepared by the procedure outlined by M. Kimura & Y. Takano, Yakugaku Zasshi, 79, 549 (1949) (c.a. 53:180308)] is used in the procedure outlined in Example 16. 3-nitro-5-phenylpyridine is isolated from the reaction mixture by chromatography on silica gel using petroleum ether-ether as eluant.

When 5-amino-3-picoline, [prepared by the procedure outlined by G. F. Hawkins & A. Roe, J. Org. Chem., 14, 328 (1949)] 2-amino-5-nitropyridine, 6-amino-3-nitro-2-picoline [prepared by the procedure outlined by L. N. Pino & W. S. Zehrung, J. Am. Chem. Soc., 77, 3154 (1955)] or 6-amino-3-bromo-2-picoline [prepared by the procedure outlined by C. A. 43:6630i] are used in the above example in place of 3-amino-5-nitropyridine, the products obtained are 5-phenyl-3-picoline, 5-nitro-2-phenylpyridine, 3-nitro-6-phenyl-2-picoline and 3-bromo-6-phenyl-2-picoline.

When the benzene in the above reaction is replaced by toluene, anisole, nitrobenzene, fluorobenzene, or benzotrifluoride, the corresponding 5-aryl-3-nitropyridines, 5-aryl-3-picolines, 2-aryl-5-nitropyridines, 6-aryl-3-nitro-2-picolines and 6-aryl-3-bromo - 2 - picolines are obtained. The products are mixtures of the isomeric arylpyridines and the isomers are separated by fractional distillation and/or column or vapor phase chromatography. In this way there are obtained:

Table I 3-nitro-5-(o-, m- and p-methylphenyl)pyridines
3-nitro-5-(o-, m- and p-methoxyphenyl)pyridines
3-nitro-5-(o-, m- and p-nitrophenyl)pyridines
3-nitro-5-(o-, m- and p-fluorophenyl)pyridines
3-nitro-5-(o-, m- and p-trifluoromethylphenyl)pyridines
5-(o-, m- and p-methylphenyl)-3-picolines
5-(o-, m- and p-methoxyphenyl)-3-picolines
5-(o-, m- and p-nitrophenyl)-3-picolines
5-(o-, m- and p-fluorophenyl)-3-picolines
5-(o-, m- and p-trifluoromethylphenyl)-3-picolines
5-nitro-2-(o-, m- and p-methylphenyl)pyridines
5-nitro-2-(o-, m- and p-methoxyphenyl)pyridines
5-nitro-2-(o-, m- and p-nitrophenyl)pyridines
5-nitro-2-(o-, m- and p-fluorophenyl)pyridines
5-nitro-2-(o-, m- and p-trifluoromethylphenyl)pyridines
6-(o-, m- and p-methylphenyl)-3-nitro-2-picolines
6-(o-, m- and p-methoxyphenyl)-3-nitro-2-picolines
6-(o-, m- and p-nitrophenyl)-3-nitro-2-picolines
6-(o-, m- and p-fluorophenyl)-3-nitro-2-picolines
6-(o-, m- and p-trifluoromethylphenyl)-3-nitro-2-picolines
6-(o-, m- and p-methylphenyl)-3-bromo-2-picolines
6-(o-, m- and p-methoxyphenyl)-3-bromo-2-picolines
6-(o-, m- and p-nitrophenyl)-3-bromo-2-picolines
6-(o-, m- and p-fluorophenyl)-3-bromo-2-picolines
6-(o-, m- and p-trifluoromethylphenyl)-3-bromo-2-picolines

EXAMPLE 21

3-amino-5-phenylpyridine 3-nitro-5-phenylpyridine (2.0 g., 0.01 mole) is hydrogenated over palladium-black catalyst (400 mg.) in ethanol (30 ml.) at 40 p.s.i. and room temperature until the calculated quantity of hydrogen is taken up.

The catalyst is removed by filtration, and the filtrate evaporated in vacuo. The residue is treated with water (30 ml.), the mixture made alkaline with aqueous 20% sodium hydroxide, and extracted with ether (3× 25 ml.). The combined extracts are dried over anhydrous sodium sulfate, filtered, and the filtrate evaporated to dryness in vacuo to give 3-amino-5-phenylpyridine.

When the 2-aryl-5-nitropyridines, 5-aryl - 3 - nitropyridines, or 6-aryl-3-nitro-2-picolines of Example 20 are used in place of 3-nitro-5-phenylpyridine in the above example, the corresponding amino compounds are obtained.

EXAMPLE 22

5-phenyl-3-pyridinol

An ice-cold solution of 3-amino-5-phenylpyridine (4.8 g., 0.028 mole) in 1 N sulfuric acid (750 ml.) is treated dropwise with a solution of sodium nitrite (2.0 g., 0.029 mole) in cold water (100 ml.). When the addition is complete, the solution is warmed on the steam-bath at ca. 60° until the evolution of nitrogen ceases.

The mixture is made alkaline with dilute aqueous sodium hydroxide and filtered. The filtrate is concentrated in vacuo to ca. 150 ml., and saturated with carbon dioxide. Dilution with ethanol precipitates the bulk of the inorganic salts which are removed by filtration and washed thoroughly with ethanol. Evaporation of the filtrate in vacuo gives 5-phenyl-3-pyridinol.

3-amino-5-phenylpyridine may be replaced in the preceding example by any of the 5-amino-2-aryl-pyridines, 3-amino-5-arylpyridines or 3-amino-6-aryl-2-picolines of Examples 21 and 40, or by any of the 3-amino-5-aryl-2-chloropyridines or 3-amino-6-aryl-2-chloropyridines of Example 41; the corresponding pyridinols are obtained.

EXAMPLE 23

3-hydroxy-5-phenylpicolinic acid

The thoroughly-dried sodium salt of 5-phenyl-3-pyridinol (9.7 g., 0.05 mole) is heated at 200° for 8 hours with dry carbon dioxide at a pressure of 1200–2000 p.s.i.

The mixture is taken up in water (50 ml.), the solution acidified with concentrated hydrochloric acid, filtered from carbonized material, and the filtrate neutralized with sodium bicarbonate. Unreacted 5-phenyl-3-pyridinol is removed by filtration, and the filtrate is acidified with acetic acid. After thorough chilling, 3-hydroxy-5-phenylpicolinic acid is collected by filtration, and washed with water.

When the 5-aryl-3-pyridinols and 6-aryl-3-pyridinols of Example 22 are used in place of 5-phenyl-3-pyridinol in the above example, the corresponding 5-aryl-3-hydroxypicolinic acids, and 6-aryl-3-hydroxypicolinic acids, respectively, are obtained. In this way there are obtained:

Table I 5-(o-, m- and p-methylphenyl)-3-hydroxypicolinic acids
5-(o-, m- and p-methoxyphenyl)-3-hydroxypicolinic acids
5-(3-carboxy-2-hydroxyphenyl)-3-hydroxypicolinic acid
5-(4-carboxy-3-hydroxyphenyl)-3-hydroxypicolinic acid
5-(3-carboxy-4-hydroxyphenyl)-3-hydroxypicolinic acid
5-(o-, m- and p-fluorophenyl)-3-hydroxypicolinic acids
5-(o-, m- and p-trifluoromethylphenyl)-3-hydroxypicolinic acids
6-(o-, m- and p-methylphenyl)-3-hydroxypicolinic acids
6-(o-, m- and p-methoxyphenyl)-3-hydroxypicolinic acids
6-(3-carboxy-2-hydroxyphenyl)-3-hydroxypicolinic acid
6-(4-carboxy-3-hydroxyphenyl)-3-hydroxypicolinic acid
6-(3-carboxy-4-hydroxyphenyl)-3-hydroxypicolinic acid
6-(o-, m- and p-fluorophenyl)-3-hydroxypicolinic acids
6-(o-, m- and p-trifluoromethylphenyl)-3-hydroxypicolinic acids

EXAMPLE 24

5-(p-fluorophenyl)-3-hydroxy-2-hydroxmethylpyridine

A solution of 5-(p-fluorophenyl)-3-pyridinol (9.5 g., 0.05 mole) in aqueous 10% sodium hydroxide (25 ml.) is treated with aqueous 36% formaldehyde (13.6 ml., 0.15 mole), and the solution is refluxed for two hours.

Upon cooling, the solution is acidified with acetic acid and evaporated in vacuo. The residue is extracted thoroughly with acetone (total volume ca. 500 ml.), the acetone removed from the extract by evaporation in vacuo, and 5 - (p - fluorophenyl)-3-hydroxy-2-hydroxymethylpyridine isolated from the residue as its hydrochloride salt by treatment with alcoholic hydrogen chloride. The salt is collected by filtration and washed with acetone.

When the 5- and 6-aryl-3-pyridinols of Example 22 are used in place of 5-(p-fluorophenyl)-3-pyridinol in the above example, the corresponding 5- and 6-aryl-3-hydroxy-2-hydroxymethylpyridine hydrochlorides are obtained.

EXAMPLE 25

5-(p-fluorophenyl)-3-hydroxypicolinic acid (A) To a solution of 5-(p-fluorophenyl)-3-hydroxy-2-hydroxymethylpyridine hydrochloride (5.1 g., 0.02 mole) in water (10 ml.) is slowly added a solution of potassium hydroxide (2.6 g., 0.045 mole) and potassium iodide (50 mg.) in water (10 ml.); during the addition, the temperature is kept below 30° by external cooling. A solution of benzyl chloride (3.0 ml., 0.024 mole) in methanol (30 ml.) is then added, and the reaction mixture is stirred at room temperature in a closed vessel for 72 hours.

Precipitated inorganic salts are removed by filtration, and washed thoroughly with methanol. The combined filtrate and washings are concentrated in vacuo until the bulk of the methanol is removed. After thorough chilling, the 3 - benzyloxy-5-(p-fluorophenyl)-2-hydroxymethylpyridine is collected by filtration and washed well with cold water.

When the 5- or 6-aryl-3-hydroxy-2-hydroxy-methylpyridines of Example 24 or the 6-aryl-3-hydroxy-2-picolines of Example 22 are used in place of 5-(p-fluorophenyl)-3-hydroxy-2-hydroxymethylpyridine in the above example, the corresponding 3-benzyloxy derivatives are obtained.

(B) The 5- or 6-aryl-3-benzyloxy-2-hydroxymethylpyridines of 6-aryl-3-benzyloxy-2-picolines of Example 25A are oxidized using the procedure of Example 17. The corresponding 5- or 6-aryl-3-benzyloxypicolinic acids are obtained.

(C) A solution of 3-benzyloxy-5-(p-fluorophenyl)-picolinic acid (6.5 g., 0.02 mole) in ethanol (200 ml.) is hydrogenated at room temperature and atmospheric pressure in the presence of 5% palladium-on-charcoal catalyst (500 mg.) until the calculated amount of hydrogen is consumed.

The catalyst is removed by filtration, and the filtrate evaporated in vacuo. The residue is taken up in an excess of aqueous sodium bicarbonate, the solution filtered, and the filtrate acidified with acetic acid. After thorough chilling, the 5-(p-fluorophenyl)-3-hydroxypicolinic acid is collected by filtration and washed with water.

When the 5- or 6-aryl-3-benzyloxypicolinic acids of Example 25B are used in place of 3-benzyloxy-5-(p-fluorophenyl)picolinic acid in the above example, the corresponding 5- or 6-aryl-3-hydroxypicolinic acids are obtained. In this way there are obtained:

Table I 5-(o-, m- and p-carboxyphenyl)3-hydroxypicolinic acids
5-(o-, m- and p-methoxyphenyl)-3-hydroxypicolinic acids
5-(3-carboxy-2-hydroxyphenyl)-3-hydroxypicolinic acid
5-(4-carboxy-3-hydroxyphenyl)-3-hydroxypicolinic acid
5-(3-carboxy-4-hydroxyphenyl)-3-hydroxypicolinic acid
5-(o-, m- and p-fluorophenyl)-3-hydroxypicolinic acids
5-(o-, m- and p-trifluoromethylphenyl)-3-hydroxypicolinic acids
6-(o-, m- and p-carboxyphenyl)-3-hydroxypicolinic acids
6-(o-, m- and p-methoxyphenyl)-3-hydroxypicolinic acids
6-(3-carboxy-2-hydroxyphenyl)-3-hydroxypicolinic acid
6-(4-carboxy-3-hydroxyphenyl)-3-hydroxypicolinic acid
6-(3-carboxy-4-hydroxyphenyl)-3-hydroxypicolinic acid
6-(o-, m- and p-fluorophenyl)-3-hydroxypicolinic acids
6-(o-, m- and p-trifluoromethylphenyl)-3-hydroxypicolinic acids
6-(o-, m- and p-hydroxyphenyl)-3-hydroxypicolinic acids

EXAMPLE 26

5- and 6-arylquinolinic acids

The 5-arylquinolinic acids are obtained by the general condensation procedure of Farley and Eliel [prepared by C. P. Farley and E. L. Eliel, J. Am. Chem. Soc., 78, 3477 (1956)] from arylacetaldehydes [prepared by C. A., 52, 16412b] of Table I below, propionaldehyde and ammonia followed by oxidation of the isolated 5-aryl-2-ethyl-3-methylpyridines with potassium permanganate according to the procedure of Example 17. The products obtained are in Table II below:

Table I phenylacetaldehyde
o-methylphenylacetaldehyde
p-t-butylphenylacetaldehyde
p-chlorophenylacetaldehyde
p-fluorophenylacetaldehyde
2,3,4,5,6-pentafluorophenylacetaldehyde
p-trifluoromethylphenylacetaldehyde
p-methoxyphenylacetaldehyde
3,4,5-trimethoxyphenylacetaldehyde
p-nitrophenylacetaldehyde
α-naphthylacetaldehyde Using the acetophenones of Table I, Example 1, 2-methyl-1-buten-3-yne and ammonia [following the procedure of I. L. Kotlyarevskii and E. D. Vasil'eva, Izvest. Akad. Nauk. S.S.S.R. Otdel. Khim. Nauk., 1834 (1940) C. A. 56: 11565b], followed by oxidation of the isolated 6-aryl-2,3-dimethylpyridines according to Example 17, there is obtained 6-arylquinolinic acids. The products obtained are in Table II below.

Table II 5- and 6-phenylquinolinic acid
5- and 6-(o-carboxyphenyl)quinolinic acid
5- and 6-(p-carboxyphenyl)quinolinic acid
5- and 6-(p-chlorophenyl)quinolinic acid
5- and 6-(p-fluorophenyl)quinolinic acid
5- and 6-(2,3,4,5,6-pentafluorophenyl)quinolinic acid
5- and 6-(p-trifluoromethylphenyl)quinolinic acid
5- and 6-(p-methoxyphenyl)quinolinic acid
5- and 6-(3,4,5-trimethoxyphenyl)quinolinic acid
5- and 6-(p-nitrophenyl)quinolinic acid
5- and 6-(α-naphthyl)quinolinic acid

EXAMPLE 27

5-(p-chlorophenyl)quinolinimide (A) The ammonium salt of 5-(p-chlorophenyl)quinolinic acid is prepared by dissolving the acid (2.1 g., 0.0075 mole) in aqueous ammonia, and diluting the solution with ethanol.

The salt is collected by filtration, dried, and then is heated slowly to 140° with acetic anhydride (10 ml.). Excess acetic anhydride is removed by evaporation in vacuo, and the residue is triturated with hot water. Upon cooling, the 5-(p-chlorophenyl)quinolinimide is collected by filtration and washed thoroughly with water.

(B) 5-(p-chlorophenyl)quinolinic acid (5.6 g., 0.02 mole) is converted to the imide following the procedure of Example 11.

When the 5- and 6-arylquinolinic acids of Example 26 are used in place of 5-(p-chlorophenyl)quinolinic acid in the above procedures, the corresponding 5- and 6-arylquinolinimides, respectively, are obtained.

EXAMPLE 28

3-amino-5-(p-chlorophenyl)picolinic acid

The 5- and 6-arylquinolinimides of Examples 27A and 27B are converted to the corresponding 3-amino-5- and 6-arylpicolinic acids by the procedure of Example 14.

EXAMPLE 29

5-(p-chlorophenyl)-3-hydroxypicolinic acid

The 3-amino-5- and 6-arylpicolinic acids of Examples 28 and 43 are converted to the corresponding 5- and 6-aryl-3-hydroxypicolinic acids by the procedure of Example 15. The products obtained are in Table I below.

Table I 5- and 6-phenyl-3-hydroxypicolinic acid
5- and 6-(o-hydroxyphenyl)-3-hydroxypicolinic acid
5- and 6-(p-hydroxyphenyl)-3-hydroxypicolinic acid
5- and 6-(p-chlorophenyl)-3-hydroxypicolinic acid
5- and 6-(p-fluorophenyl)-3-hydroxypicolinic acid
5- and 6-(2,3,4,5,6-pentafluorophenyl)-3-hydroxypicolinic acid
5- and 6-(p-trifluoromethylphenyl)-3-hydroxypicolinic acid
5- and 6-(p-methoxyphenyl)-3-hydroxypicolinic acid
5- and 6-(3,4,5-trimethoxyphenyl)-3-hydroxypicolinic acid
5- and 6-(p-nitrophenyl)-3-hydroxypicolinic acid
5- and 6-(α-naphthyl)-3-hydroxypicolinic acid

EXAMPLE 30

Ethyl 2-chloro-6-phenylnicotinate 2-hydroxy-6-phenylnicotinic acid [prepared by the procedure outlined by (a) C. A. 12: 1107, (b) C. Barat, J. Indian Chem. Soc., 8, 801 (1931), (c) A. Dornow and P. Karlson, Ber., 73B, 542 (1940), (d) A. Dornow and E. Neuse, Chem. Ber., 84, 296 (1951)] (10.8 g., 0.05 mole) is treated with phosphorus oxychloride and phosphorus pentachloride according to the procedure of Example 3.

Following removal of excess phosphorus oxychloride, the residue is cooled to 0° and diluted slowly with ice-cold absolute ethanol (25 ml.). The solution is allowed to stand overnight at room temperature and then is poured onto cracked ice (ca. 80 g.). The mixture is extracted repeatedly with ether, the combined extracts washed with water, dried over anhydrous sodium sulfate, filtered, and evaporated in vacuo to give ethyl 2-chloro-6-phenylnicotinate.

When the 6-aryl-2-hydroxynicotinic acids of Examples 51, 58, 60 and 61 are used in place of 2-hydroxy-6-phenylnicotinic acid in the above example, the corresponding 6-aryl-2-chloronicotinic acid ethyl esters are obtained.

When 2-hydroxy-5-phenylnicotinic acid [prepared by M. Julia, H. Pinkas and J. Igolen, Bull. Soc. Chem. France, 2387 (1966)] or any of the 5-aryl-2-hydroxynicotinic acids of Examples 51 and 55 are used in place of 2-hydroxy-6-phenylnicotinic acid in the above example, the corresponding 5-aryl-2-chloronicotinic acid ethyl ester is obtained.

EXAMPLE 31

Ethyl 6-phenylnicotinate

The 5- and 6-aryl-2-chloronicotinic acid ethyl esters of Example 30 are treated according to the procedure of Example 4. The corresponding 5- and 6-arylnicotinic acid ethyl esters are obtained.

EXAMPLE 32

6-(p-fluorophenyl)nicotine

A solution of p-fluorophenyllithium is prepared from lithium (1.4 g., 0.20 g. atom) and p-fluorobromobenzene (17.5 g., 0.10 mole) in anhydrous ether (180 ml.) under nitrogen. To this solution, a solution of nicotine (16.2 g. 0.10 mole) in anhydrous ether (40 ml.) is added dropwise with stirring at such a rate as to maintain gentle boiling of the ether. The ether is then evaporated and simultaneously replaced by dry toluene (70 ml.). The temperature is raised to 110° and the mixture is stirred at that temperature under nitrogen for 8 hours.

The reaction mixture is cooled, treated carefully with water, and the toluene layer separated. The aqueous phase is extracted repeatedly with ether, the organic phases combined and extracted with 10% hydrochloric acid. The aqueous acid extracts are made alkaline and extracted with ether. The combined ether extracts are dried over potassium hydroxide pellets, and evaporated in vacuo. The residue is distilled in vacuo to give a mixture of 2- and 6-(p-fluorophenyl)nicotine.

The isomers are separated by preparative vapor phase chromatography using a ½ - inch preparative column packed with silicone on celite and operated at 190°. The collected 6-(p-fluorophenyl)nicotine is purified further by redistillation in vacuo.

When 3-picoline is used in place of nicotine in the above example, 6-(p-fluorophenyl)-3-picoline is obtained.

Other aryllithium compounds may be used in place of p-fluorophenyllithium in the above example. The corresponding 6-arylnicotines or 6 - aryl - 3 - picolines are obtained.

The 5-aryl-3-picolines are prepared by the procedure of Example 20. They are also isolated by chromatography from among the products of the condensation of arylacetaldehydes with propionaldehyde and ammonia [following the procedure of C. P. Farley and E. L. Eliel, J. Am. Chem. Soc., 78, 3477 (1956)] (see Example 26).

EXAMPLE 33

6-(p-fluorophenyl)nicotinic acid

The 6-arylnicotines or 6-aryl-3-picolines of Example 32, and the 5-aryl-3-picolines of Examples 20 and 32, are oxidized according to the procedure of Example 17. The corresponding 6 - arylnicotinic acids and 5 - arylnicotinic acids, respectively, are obtained.

EXAMPLE 34

Ethyl 6-(p-fluorophenyl)nicotinate

A solution of 6-(p-fluorophenyl)nicotinic acid (4.3 g., 0.02 mole) in absolute ethanol (9.2 g.=11.7 ml., 0.20 mole) is treated slowly, and with stirring, with concentrated sulfuric acid (0.8 ml.), and then is heated under reflux for 8 hours.

Excess ethanol is removed by evaporation in vacuo, and the residue is treated, with stirring, with ice-water (35 ml.). The mixture is extracted with ether (3 × 25 ml.), the combined ether extracts washed with aqueous 10% sodium bicarbonate and with water, dried over anhydrous magnesium sulfate, filtered, and evaporated in vacuo to give ethyl 6-(p-fluorophenyl)nicotinate.

When the 5- and 6-arylnicotinic acids of Examples 33 and 37 are used in place of 6-(p-fluorophenyl)nicotinic acid in the above example, the corresponding ethyl esters are obtained.

EXAMPLE 35

5-(p-chlorobenzoyl)-2-(p-chlorophenyl)pyridine oxime

The sodium salt of p-chlorobenzoylacetaldehyde (20.4 g., 0.10 mole) is decomposed in aqueous solution at 0° by the addition, with stirring, of acetic acid in ether. The cold ether phase is separated and treated gradually with an ice-cold saturated solution of ammonium acetate (6.2 g., 0.08 mole) in acetic acid. The mixture is allowed to warm to room temperature, kept for 3 days, filtered, and the filtrate evaporated in vacuo.

The residue is taken up in aqueous 10% sodium hydroxide (30 ml.), sufficient ethanol being added to give a clear solution. The solution is added to a solution of hydroxylamine hydrochloride (6.9 g., 0.10 mole) in water (40 ml.), and the mixture is warmed on the steam bath for 2½ hours. After thorough chilling, the oxime of 5-(p-chlorobenzoyl) - 2 - (p-chlorophenyl)pyridine is collected by filtration, and washed with cold water.

When p-chlorobenzoylacetaldehyde is replaced in the above example by other hydroxymethyleneacetophenones such as those of Table I below, the corresponding 5-aroyl-2-arylpyridine oximes are obtained.

Table I o-, m- and p-fluorobenzoylacetaldehyde
o-, m- and p-methoxybenzoylacetaldeyde
3,4-dimethoxybenzoylacetaldehyde
o-, m- and p-methylbenzoylacetaldehyde
2,4-dimethylbenzoylacetaldehyde
2,6-dimethylbenzoylacetaldehyde
o-, m- and p-trifluoromethylbenzoylacetaldehyde
o-, m- and p-nitrobenzoylacetaldehyde.

EXAMPLE 36

N-(p-chlorophenyl)-6-(p-chlorophenyl)nicotinamide 5-(p-chlorobenzoyl) - 2 - (p-chlorophenyl)pyridine oxime (5.1 g., 0.015 mole) and phosphorus pentachloride (5.2 g., 0.025 mole), both finely-powdered, are heated together on the steam-bath until evolution of hydrogen chloride subsides. Heating is continued for 15 minutes longer, and then the mixture is cooled and treated with ice. N-(p-chlorophenyl) - 6 - (p-chlorophenyl)nicotinamide is collected by filtration, and washed thoroughly with cold water.

When the 5-aroyl-2-arylpyridine oximes of Example 35 are used in place of 5-(p-chlorobenzoyl)-2-(p-chlorophenyl)pyridine oxime in the above example, the corresponding N-aryl-6-arylnicotinamides are obtained.

EXAMPLE 37

6-(p-chlorophenyl)nicotinic acid

N-(p-chlorophenyl) - 6 - (p - chlorophenyl)nicotinamide (5.1 g., 0.015 mole) is treated with concentrated hydrochloric acid (15 ml.), and the mixture is heated under reflux for 4 hours.

The solvent is evaporated in vacuo, and the residue treated with a slight excess of aqueous 10% sodium hydroxide. The alkaline mixture is extracted thoroughly with methylene chloride, and the extracts discarded. The aqueous phase is rendered slightly acidic with acetic acid, and chilled. 6-(p-chlorophenyl)nicotinic acid is collected by filtration and washed thoroughly with cold water.

When the N-aryl-6-arylnicotinamides of Example 36 are used in place of N-(p-chlorophenyl))-6-(p-chlorophenyl)nicotinamide in the above example, the corresponding 6-arylnicotinic acids are obtained.

EXAMPLE 38

Ethyl 6-(p-fluorophenyl)-2-methylnicotinate

A solution of 3-chloro-4'-fluoroacrylphenone (11.1 g., 0.06 mole) [which is prepared starting from p-fluorobenzoyl chloride by the procedure of Klimko et al., Zhur. Obshcchei Khim. 27, 370 (1957)] and ethyl β-amino-crotonate (15.5 g., 0.12 mole) in dry benzene is heated under reflux for 8 hours.

The solvent is removed by evaporation in vacuo and the residue is fractionally distilled in vacuo to give ethyl 6-(p-fluorophenyl)-2-methylnicotinate.

Other 3-chloroacrylophenones may be used in place of 3-chloro-4'-fluoroacrylophenone in the example; the corresponding 6-aryl-2-methylnicotinic acid ethyl esters are obtained.

EXAMPLE 39

6-(p-fluorophenyl)nicotinamide

A solution of ethyl 6-(p-fluorophenyl)nicotinate (4.9 g., 0.02 mole) in methanol (50 ml.) is saturated with ammonia at 0° and kept at 0–5° for three days. 6-(p-fluorophenyl)nicotinamide is collected by filtration, and washed thoroughly with cold water.

The 5- and 6-arylnicotinic acid ethyl esters of Examples 31 and 34 or the 6-aryl-2-methylnicotinic acid ethyl esters of Example 38 may be used in place of ethyl 6-(p-fluorophenyl)nicotinate in the above example; the corresponding amides are obtained.

EXAMPLE 40

5-amino-2-(p-fluorophenyl)pyridine

Finely-powdered 6-(p-fluorophenyl)nicotinamide (4.3 g., 0.020 mole) is added at 0° to a stirred solution of bromine (3.5 g., 0.022 mole) and potassium hydroxide (4.5 g., 0.08 mole) in water (25 ml.). After 15 minutes, the mixture is warmed to 70–80° and kept in that temperature range for one hour.

The mixture is cooled, and extracted with ether (3 × 25 ml.). The combined extracts are washed with water, dried over anhydrous magnesium sulfate, filtered, and treated with gaseous hydrogen chloride to precipitate the product as its hydrochloride salt. 5-amino-2-p-(fluorophenyl)pyridine hydrochloride is collected by filtration, washed with ether, and recrystallized from alcohol/ether.

The free base is regenerated by dissolving the hydrochloride in water, renderiing the solution alkaline with ammonia, and extracting the mixture repeatedly with ether. Evaporation of the dried and filtered combined extracts gives 5-amino-2-(p-fluorophenyl)pyridine.

When the 5- and 6-arylnicotinamides or 6-aryl-2-methylnicotinamides of Example 39 are used in place of 6-(p-fluoropheny)nicotinamide in the above example, the corresponding 3-amino-5-arylpyridine, 5-amino-2-arylpyridines, or 3-amino-6-aryl-2-picolines, respectively, are obtained.

EXAMPLE 41

3-amino-2-chloro-6-phenylpyridine

2 - hydroxy - 6-phenylnicotinic acid [prepared by the procedure outlined by (a) C.A. 12:1107, (b) C. Barat, J. Indian Chem. Soc., 8, 801 (1931), (c) A. Dornow and P. Karlson, Ber., 73B, 542 (1940), (d) A. Dornow and E. Neuse, Chem. Ber., 84, 296 (1951)] (10.8 g., 0.050 mole) is treated with phosphorus oxychloride and phosphorus pentachloride according to the procedure of Example 3.

Following removal of excess phosphorus oxychloride, the residue is taken up in dry benzene (60 ml.), and to the resulting solution is added freshly-activated sodium azide (3.6 g., 0.055 mole). The mixture is refluxed for 24 hours with exclusion of moisture.

The cooled mixture is filtered from inorganic material, the filter cake washed with a little benzene, and the combined filtrate and washings treated with concentrated hydrochloric acid (30 ml.). The mixture is refluxed for 3 hours, cooled, and the layers separated. The acidic aqueous phase is rendered alkaline by the addition of ammonia, and extracted repeatedly with ether. The combined ether extracts are washed with water, dried over anhydrous sodium sulfate, filtered, and evaporated in vacuo to give 3-amino-2-chloro-6-phenylpyridine.

When any of the 5-aryl-2-hydroxynicotinic acids of Examples 51 and 55, or any of the 6-aryl-2-hydroxynicotinic acids of Examples 51, 58, 60 and 61 is used in place of 2-hydroxy-6-phenylnicotinic acid in the above example, the corresponding 3-amino-5- or 6-aryl-2-chloropyridine is obtained.

EXAMPLE 42

2-cyano-6-(p-fluorophenyl)-3-pyridinol

A mixture of 2-chloro-6-(p-fluorophenyl)-3-pyridinol (4.5 g., 0.02 mole), cuprous cyanide (5.4 g., 0.06 mole), and p-xylene (120 ml.) is stirred under reflux for 15 hours.

After thorough cooling, precipitated solids are collected by filtration and dried. The solid is extracted repeatedly with 50 ml. portions of boiling ethanol, the combined alcoholic extracts filtered hot, and evaporated in vacuo to give 2-cyano-6-(p-fluorophenyl)-3-pyridinol.

When the 5- and 6-aryl-2-chloro-3-pyridinols of Example 22 or the 3-amino-5- and 6-aryl-2-chloropyridines of Example 41 are used in place of 2-chloro-6-(p-fluorophenyl)-3-pyridinol in the above example, the corresponding 5- and 6-aryl-2-cyano-3-pyridinols or 3-amino-5- and 6-aryl-2-cyanopyridines, respectively, are obtained.

EXAMPLE 43

6-(p-fluorophenyl)-3-hydroxypicolinic acid

2 - cyano-6-(p-fluorophenyl)-3-pyridinol (2.1 g., 0.01 mole) is refluxed with aqueous 10% potassium hydroxide (30 ml.) for 3½ hours.

The mixture is cooled, filtered, and acidified with acetic acid. After thorough chilling, 6-(p-fluorophenyl)-3-hydroxypicolinic acid is collected by filtration, and washed with cold water.

When the 5- and 6-aryl-2-cyano-3-pyridinols of Example 42 are used in place of 2-cyano-6-(p-fluorophenyl)-3-pyridinol in the above example, the corresponding 5- and 6-aryl-3-hydroxypicolinic acids are obtained.

When the 3-amino-5- and 6-aryl-2-cyanopyridines of Example 42 are used, the corresponding 3-amino-5- and 6-arylpicolinic acids are obtained; the latter are treated further according to the procedure of Example 29 to give the corresponding 5- and 6-aryl-3-hydroxypicolinic acids. Table I below shows the 5-aryl-3-hydroxypicolinic acid products obtained.

Table I 5-phenyl-3-hydroxypicolinic acid
5-(p-chlorophenyl)-3-hydroxypicolinic acid
5-(p-bromophenyl)-3-hydroxypicolinic acid
5-(o-methylphenyl)-3-hydroxypicolinic acid
5-(3,6-dimethylphenyl)-3-hydroxypicolinic acid
5-(3,4-dihydroxyphenyl)-3-hydroxypicolinic acid
5-(2,6-dimethoxyphenyl)-3-hydroxypicolinic acid
5-(2-methyl-4-methoxyphenyl)-3-hydroxypicolinic acid
5-(p-nitrophenyl)-3-hydroxypicolinic acid
5-(p-trifluoromethylphenyl)-3-hydroxypicolinic acid
5-(p-dimethylaminophenyl)-3-hydroxypicolinic acid
5-(β-naphthyl)-3-hydroxypicolinic acid
5-(p-mercaptophenyl)-3-hydroxypicolinic acid
5-(p-methylsulfonylphenyl)-3-hydroxypicolinic acid
5-(p-benzoylaminophenyl)-3-hydroxypicolinic acid
5-(p-fluorophenyl)-3-hydroxy-4-methylpicolinic acid
5-(o-bromophenyl)-3-hydroxypicolinic acid
5-(p-chlorophenyl)-3-hydroxypicolinic acid
5-(2,3-dimethylphenyl)-3-hydroxypicolinic acid
5-(p-methylphenyl)-3-hydroxypicolinic acid
5-(p-methoxyphenyl)-3-hydroxypicolinic acid
5-(p-methylthiophenyl)-3-hydroxypicolinic acid
5-(3,4-dimethoxyphenyl)-3-hydroxypicolinic acid
5-(o-methylphenyl)-3-hydroxy-4-methylpicolinic acid
5-(p-ethylphenyl)-3-hydroxy-4-methylpicolinic acid
5-(o-methoxyphenyl)-3-hydroxy-4-methylpicolinic acid
5-(3,4-dimethoxyphenyl)-3-hydroxy-4-methylpicolinic acid
5-(p-chlorophenyl)-3-hydroxy-4-methylpicolinic acid
5-(3,4-dichlorophenyl)-3-hydroxy-4-methylpicolinic acid
5-(3-chloro-4-methoxyphenyl)-3-hydroxy-4-methylpicolinic acid
5-phenyl-3-hydroxy-4-ethylpicolinic acid
5-(p-chlorophenyl)-3-hydroxy-4-ethylpicolinic acid
5-(3,4-dichlorophenyl)-3-hydroxy-4-ethylpicolinic acid
5-(p-methoxyphenyl)-3-hydroxy-4-ethylpicolinic acid
5-(3,4-dimethoxyphenyl)-3-hydroxy-4-ethylpicolinic acid
5-(3,4,5-trimethoxyphenyl)-3-hydroxy-4-ethylpicolinic acid

EXAMPLE 44

α-Uredio-2-[5-(p-chlorophenyl)furan]acetonitrile

A mixture of 5-(p-chlorophenyl)furfural [prepared by the procedure outlined by R. Oda, Mem. Fac. Eng. Kyoto Univ., 14, 195 (1952). C.A. 48: 1935f] (11.9 g., 0.055 mole) and acetic acid (3.6 g., 0.061 mole) is added slowly, with stirring, to an ice-cold solution of potassium cyanide (4.0 g., 0.061 mole) in water (15 ml.) and ethanol (18 ml.). When the addition is complete (ca. 75 minutes), the reaction mixture is stirred for 1 hour at 10°.

The mixture is extracted repeatedly with ether, the combined extracts dried over anhydrous magnesium sulfate, filtered, and evaporated in vacuo.

The residual crude cyanohydrin is treated with urea (4.9 g., 0.081 mole) and formic acid (0.23 ml.), and the mixture is heated at 100° with stirring for 20 minutes. The mixture is then extracted repeatedly with boiling water, the combined extracts filtered hot, and chilled thoroughly. α-Ureido-2-[5-(p-chlorophenyl)furan]-acetonitrile is collected by filtration, and washed with cold water.

When other 4- and 5-arylfurfurals are used in the above example in place of 5-(p-chlorophenyl)furfural, the corresponding α-ureido - 2 - (4- and 5-arylfuran) acetonitriles are obtained.

EXAMPLE 45

6-(p-chlorophenyl)-3-hydroxypicolinic acid

A solution of chlorine (2.0 g., 0.028 mole) in water (325 ml.) is added dropwise to a stirred suspension of α-ureido - 2 - [5-(p-chlorophenyl)furan]acetonitrile (5.0 g., 0.018 mole) in 6 N hydrochloric acid (225 ml.) at 0°. When the addition is complete (ca. 10 minutes), the mixture is stirred at 0–5° for 30 minutes, and then is heated slowly (during ca. 20 minutes) to 85°. The mixture is rapidly cooled in an ice-bath, and the pH is adjusted to ca. 6 with aqueous 40% sodium hydroxide. The mixture is extracted continuously with ether overnight, the extract dried over anhydrous magnesium sulfate, filtered, and evaporated in vacuo to give a mixture consisting of 6-(p-chlorophenyl) - 3 - hydroxypicolinamide and 6-(p-chlorophenyl)-3-hydroxypicolinonitrile.

The mixture is hydrolyzed with concentrated hydrochloric acid according to the procedure of Example 37 to give 6-(p-chlorophenyl)-3-hydroxypicolinic acid.

When the α-ureido - 2 - (4- and 5-arylfuran)-acetonitriles of Example 44 are used in place of α-ureido-2-[5-(p-chlorophenyl)furan]acetonitrile in the above example, the corresponding 5- and 6-aryl-3-hydroxypicolinic acids are obtained.

EXAMPLE 46

6-(p-fluorophenyl)-3-hydroxypicolinic acid 3-bromo - 6 - (p-fluorophenyl) - 2 - picoline or any of the 6-aryl - 3 - bromo - 2 - picolines of Example 20 is oxidized according to the procedure of Example 17, and the isolated 6-aryl - 3 - bromopicolinic acid is treated further according to the procedure of Example 19 to give the 6-aryl - 3 - hydroxypicolinic acids of Table I below.

Table I 6-(o-, m- and p-carboxyphenyl)-3-hydroxypicolinic acid
6-(o-, m- and p-methoxyphenyl)-3-hydroxypicolinic acid
6-(o-, m- and p-nitrophenyl)-3-hydroxypicolinic acid
6-(o-, m- and p-fluorophenyl)-3-hydroxypicolinic acid
6-(o-, m- and p-trifluoromethylphenyl)-3-hydroxypicolinic acid

EXAMPLE 47

3-dimethylamino-2-(p-fluorophenyl)acrolein

Freshly-distilled phosphorus oxychloride (69.0 g., 0.45 mole) is stirred while dimethylformamide (40.5 g., 0.55 mole) is added dropwise at such a rate that the temperature does not exceed 30°. Then, a solution of p-fluorophenylacetic acid (23.1 g., 0.15 mole) in dimethylformamide (14.6 g., 0.20 mole) is added dropwise during one hour.

When the addition is complete, the reaction mixture is warmed slowly to 70–75°, and the temperature is then maintained for 16 hours.

The mixture is poured onto cracked ice (ca. 500 g.), and rendered alkaline by the gradual addition of powdered potassium carbonate (ca. 200 g.). Benzene (100 ml.) is added, and the mixture is warmed at 70–75° with stirring for 12 hours.

Upon cooling, the layers are separated, and the aqueous layer extracted thoroughly with fresh benzene. The combined benzene layers are washed with water, dried over anhydrous magnesium sulfate, filtered, and evaporated. 3 - dimethylamino - 2 - (p-fluorophenyl)acrolein is obtained on distillation of the residue in vacuo.

When the arylacetic acids of Table I below are used in place of p-fluorophenylacetic acid in the above example, the corresponding 2 - aryl - 3 - dimethylaminoacroleins of Table II below are obtained.

Table I phenylacetic acid
p-chlorophenylacetic acid
p-bromophenylacetic acid
o-methylphenylacetic acid
2,5-dimethylphenylacetic acid
3,4-dihydroxyphenylacetic acid
2,6-dimethoxyphenylacetic acid
2-methyl-4-methoxyphenylacetic acid
p-nitrophenylacetic acid p-trifluoromethylphenylacetic acid
p-dimethylaminophenylacetic acid
β-naphthylacetic acid
styrylacetic acid
p-mercaptophenylacetic acid
p-methylsulfonylphenylacetic acid
p-benzoylaminophenylacetic acid Table II 3-dimethylamino-2-phenylacrolein
3-dimethylamino-2-(p-chlorophenyl)acrolein
3-dimethylamino-2-(p-bromophenyl)acrolein
3-dimethylamino-2-(o-methylphenyl)acrolein
3-dimethylamino-2-(2,5-dimethylphenyl)acrolein
3-dimethylamino-2-(3,4-dihydroxyphenyl)acrolein
3-dimethylamino-2-(2,6-dimethoxyphenyl)acrolein
3-dimethylamino-2-(2-methyl-4-methoxyphenyl)acrolein
3-dimethylamino-2-(p-nitrophenyl)acrolein
3-dimethylamino-2-(p-trifluoromethylphenyl)acrolein
3-dimethylamino-2-(p-dimethylaminophenyl)acrolein
3-dimethylamino-2-(β-naphthyl)acrolein
3-dimethylamino-2-(styryl)acrolein
3-dimethylamino-2-(p-mercaptophenyl)acrolein
3-dimethylamino-2-(p-methylsulfonylphenyl)acrolein
3-dimethylamino-2-(p-benzoylaminophenyl)acrolein

EXAMPLE 48

5-(p-fluorophenyl)-2-hydroxynicotinonitrile

To a methanolic solution of sodium methoxide, freshly prepared from sodium (6.9 g., 0.30 g.-atom) and anhydrous methanol (150 ml.), is added rapidly 3-dimethylamino-2-(p-fluorophenyl)acrolein (29.0 g., 0.15 mole) and cyanoacetamide (12.8 g., 0.15 mole). The mixture is then heated at reflux for 4 hours.

After thorough chilling, the precipitate is collected by filtration, washed with cold methanol, and then redissolved in water (100 ml.). Acidification of the aqueous solution with 2 N hydrochloric acid and thorough chilling gives 5-(p-fluorophenyl) - 2 - hydroxynicotinonitrile. The product is collected by filtration, and washed thoroughly with cold water.

When 3 - dimethylamino-2-(p-fluorophenyl)acrolein is replaced in the above example by any of the 2-aryl-3-dimethylaminoacroleins of Table II, Example 47, the corresponding 5-aryl-2-hydroxynicotinonitriles of Table I below are obtained.

Table I 5-phenyl-2-hydroxynicotinonitrile
5-(p-chlorophenyl)-2-hydroxynicotinonitrile
5-(p-bromophenyl)-2-hydroxynicotinonitrile
5-(o-methylphenyl)-2-hydroxynicotinonitrile
5-(2,5-dimethylphenyl)-2-hydroxynicotinonitrile
5-(3,4-dihydroxyphenyl)-2-hydroxynicotinonitrile
5-(2,6-dimethoxyphenyl)-2-hydroxynicotinonitrile
5-(2-methyl-4-methoxyphenyl)-2-hydroxynicotinonitrile
5-(p-nitrophenyl)-2-hydroxynicotinonitrile
5-(p-trifluoromethylphenyl)-2-hydroxynicotinonitrile
5-(p-dimethylaminophenyl)-2-hydroxynicotinonitrile
5-(β-naphthyl)-2-hydroxynicotinonitrile
5-(styryl)-2-hydroxynicotinonitrile
5-(p-mercaptophenyl)-2-hydroxynicotinonitrile
5-(p-methylsulfonylphenyl)-2-hydroxynicotinonitrile
5-(p-benzoylaminophenyl)-2-hydroxynicotinonitrile

EXAMPLE 49

2-(p-fluorophenyl)acetoacetaldehyde

Dry sodium methoxide, freshly prepared from sodium (6.9 g., 0.30 g.-atom), is finely powdered and suspended in anhydrous ether (100 ml.). The suspension is stirred vigorously and cooled in an ice-bath, while a solution of p-fluorophenylacetone [prepared by the procedure outlined by C. A. 54: 4492f] (42.6 g., 0.28 mole) and ethyl formate (29.6 g., 0.40 mole) in anhydrous ether (50 ml.) is added. Stirring and cooling are continued until the sodium methoxide dissolves, and then the solution is allowed to stand, with exclusion of moisture, overnight at room temperature.

Water (150 ml.) is added, the mixture shaken vigorously, and the layers separated. The aqueous phase is washed with ether, acidified with dilute hydrochloric acid, and extracted repeatedly with fresh ether. The combined extracts are dried over anhydrous magnesium sulfate, filtered, and evaporated in vacuo to give 2-(p-fluorophenyl)-acetoacetaldehyde.

When the following 1-aryl-2-propanones of Table I below are used in place of p-fluorophenylacetone in the above example, the corresponding 2-arylacetoacetaldehydes of Table II are obtained.

Table I o-hydroxybenzyl methyl ketone
2,3,6-trihydroxybenzyl ketone
2,4-dimethyl-6-hydroxybenzyl ketone
o-methylbenzyl ketone
2,5-dimethylbenzyl ketone
p-methoxybenzyl ketone
3,4-dimethoxybenzyl ketone
3-methyl-4-methoxybenzyl ketone
p-chlorobenzyl ketone
3,4-dichlorobenzyl ketone
3-chloro-4-methoxybenzyl ketone
p-bromobenzyl ketone
p-trifluoromethylbenzyl ketone
p-trifluoromethyl-2-nitrobenzyl ketone
p-aminobenzyl ketone
p-dimethylaminobenzyl ketone
o-nitrobenzyl ketone
2,6-dinitrobenzyl ketone Table II 2-(o-hydroxyphenyl)acetoacetaldehyde
2-(2,3,6-trihydroxyphenyl)actoacetaldehyde
2-(2,4-dimethyl-6-hydroxyphenyl)acetoacetaldehyde
2-(o-methylphenyl)acetoacetaldehyde
2-(2,5-dimethylphenyl)acetoacetaldehyde
2-(p-methoxyphenyl)acetoacetaldehyde
2-(2,4-dimethoxyphenyl)acetoactaldehyde
2-(3-methyl-4-methoxyphenyl)acetoacetaldehyde
2-(p-chlorophenyl)acetoacetaldehyde
2-(3,4-dichlorophenyl)acetoacetaldehyde
2-(3-chloro-4-methoxyphenyl)acetoacetaldehyde
2-(p-bromophenyl)acetoacetaldehyde
2-(p-trifluoromethyl)acetoacetaldehyde
2-(p-trifluoromethyl-2-nitrophenyl)acetoacetaldehyde
2-(p-aminophenyl)acetoacetaldehyde
2-(p-dimethylaminophenyl)acetoacetaldehyde
2-(o-nitrophenyl)acetoacetaldehyde
2-(2,6-dinitrophenyl)acetoacetaldehyde

EXAMPLE 50

Methyl 5-(p-fluorophenyl)-2-hydroxy-6-methylnicotinate

To a well-stirred solution of 2(p-fluorophenyl)acetoacetaldehyde (39.6 g., 0.22 mole) in methanol (175 ml.) is added gradually, ethyl cyanoacetate (24.9 g., 0.22 mole), followed by a solution of piperidine (21 ml.) in methanol (35 ml.); the addition of the reactants is carried out at such a rate that the temperature does not exceed 40°. When the addition is complete, the mixture is heated under reflux for 30 minutes.

Upon cooling, the mixture is treated gradually with acetic acid (42 ml.), concentrated to about ⅔ of its former volume by evaporation in vacuo, and chilled thoroughly. Methyl 5-(p-fluorophenyl)-2-hydroxy-6-methylnicotinate is collected by filtration and washed with a little cold methanol. Further concentration of the mother liquor affords additional product.

When the 2-arylacetoacetaldehydes of Table II, Example 49, are used in place of 2-(p-fluorophenyl)-acetoacetaldehyde in the above example, the corresponding 5-aryl-2-hydroxy-6-methylnicotinic acid methyl esters of Table I below are obtained.

Table I methyl 5-(o-hydroxyphenyl)-2-hydroxy-6-methylnicotinate
methyl 5-(2,3,6-trihydroxyphenyl)-2-hydroxy-5-methylnicotinate
methyl 5-(2,4-dimethyl-6-hydroxyphenyl)-2-hydroxy-6-methylnicotinate
methyl 5-(o-methylphenyl)-2-hydroxy-6-methylnicotinate
methyl 5-(2,5-dimethylphenyl)-2-hydroxy-6-methylnicotinate
methyl 5-(p-methoxyphenyl)-2-hydroxy-6-methylnicotinate
methyl 5-(3,4-dimethoxyphenyl)-2-hydroxy-6-methylnicotinate
methyl 5-(3-methyl-4-methoxyphenyl)-2-hydroxy-6-methylnicotinate
methyl 5-(p-chlorophenyl)-2-hydroxy-6-methylnicotinate
methyl 5-(3,4-dichlorophenyl)-2-hydroxy-6-methylnicotinate
methyl 5-(3-chloro-4-methoxyphenyl)-2-hydroxy-6-methylnicotinate
methyl 5-(p-bromophenyl)-2-hydroxy-6-methylnicotinate
methyl 5-(p-trifluoromethyl)-2-hydroxy-6-methylnicotinate
methyl 5-(p-trifluoromethyl-2-nitrophenyl)-2-hydroxy-6-methylnicotinate
methyl 5-(p-aminophenyl)-2-hydroxy-6-methylnicotinate
methyl 5-(p-dimethylaminophenyl)-2-hydroxy-6-methylnicotinate
methyl 5-(o-nitrophenyl)-2-hydroxy-6-methylnicotinate
methyl 5-(2,6-dinitrophenyl)-2-hydroxy-6-methylnicotinate Ethyl cyanoacetate may be replaced in the above example by cyanoacetamide; the corresponding 5-aryl-2-hydroxy-6-methylnicotinonitriles are thereby obtained.

EXAMPLE 51

5-(p-fluorophenyl)-2-hydroxynicotinic acid

A mixture of 5-(p-fluorophenyl)-2-hydroxynicotinonitrile (21.4 g. 0.10 mole) and concentrated hydrochloric acid (100 ml.) is heated under reflux for 3 hours. The solution is allowed to cool, and then is poured on cracked ice (ca. 500 g.). 5-p-fluorophenyl)-2-hydroxynicotinic acid is collected by filtration, and washed thoroughly with cold water.

When the 5-aryl-2-hydroxynicotinonitriles of Table I, Example 48, are used in place of 5-(p-fluorophenyl)-2-hydroxynicotinonitrile in the above example, the corresponding 5-aryl-2-hydroxynicotinic acids of Table I below are obtained.

Table I 5-phenyl-2-hydroxynicotinic acid
5-(p-chlorophenyl)-2-hydroxynicotinic acid
5-(p-bromophenyl)-2-hydroxynicotinic acid
5-(o-methylphenyl)-2-hydroxynicotinic acid
5-(2,5-dimethylphenyl)-2-hydroxynicotinic acid
5-(3,4-dihydroxyphenyl)-2-hydroxynicotinic acid
5-(2,6-dimethoxyphenyl)-2-hydroxynicotinic acid
5-(2-methyl-4-methoxyphenyl)-2-hydroxynicotinic acid
5-(p-nitrophenyl)-2-hydroxynicotinic acid
5-(p-trifluoromethylphenyl)-2-hydroxynicotinic acid
5-(p-dimethylaminophenyl)-2-hydroxynicotinic acid
5-(β-naphthyl)-2-hydroxynicotinic acid
5-(styryl)-2-hydroxynicotinic acid
5-(p-mercaptophenyl)-2-hydroxynicotinic acid
5-(p-methylsulfonylphenyl)-2-hydroxynicotinic acid
5-(p-aminophenyl)-2-hydroxynicotinic acid When the 5-aryl-2-hydroxy-6-methylnicotinic acid methyl esters of 5-aryl-2-hydroxy-6-methylnicotinonitriles of Example 50 are used in place of 5-(p-fluorophenyl)-2-hydroxynicotinonitrile in the above example, the corresponding 5-aryl-2-hydroxy-6-methylnicotinic acids are obtained.

When the 6-aryl-2-hydroxynicotinonitriles or 6-aryl-2-hydroxynicotinic acid ethyl esters of Example 56 are used in place of 5-(p-fluorophenyl)-2-hydroxynicotinonitrile in the above example, the corresponding 6-aryl-2-hydroxynicotinic acids of Table II below are obtained.

Table II 6-(o-, m- and p-fluorophenyl)-2-hydroxynicotinic acid
6-(o-, m- and p-methoxyphenyl)-2-hydroxynicotinic acid
6-(3,4-dimethoxyphenyl)-2-hydroxynicotinic acid
6-(o-, m- and p-methylphenyl)-2-hydroxynicotinic acid
6-(2,4-dimethylphenyl)-2-hydroxynicotinic acid
6-(2,6-dimethylphenyl)-2-hydroxynicotinic acid
6-(o-, m- and p-trifluoromethylphenyl)-2-hydroxynicotinic acid
6-(o-, m- and p-nitrophenyl)-2-hydroxynicotinic acid
6-phenyl-5-methyl-2-hydroxynicotinic acid
6-(p-methylphenyl)-5-methyl-2-hydroxynicotinic acid
6-(2,4-dimethylphenyl)-5-methyl-2-hydroxynicotinic acid
6-(2-methylthio-5-methylphenyl)-5-methyl-2-hydroxynicotinic acid
6-(o-methoxyphenyl)-5-methyl-2-hydroxynicotinic acid
6-(p-methoxyphenyl)-5-methyl-2-hydroxynicotinic acid
6-(2,6-dimethoxyphenyl)-5-methyl-2-hydroxynicotinic acid
6-phenyl-5-ethyl-2-hydroxynicotinic acid
6-(p-methylphenyl)-5-ethyl-2-hydroxynicotinic acid
6-(p-methoxyphenyl)-5-ethyl-2-hydroxynicotinic acid
6-(o-nitrophenyl)-5-ethyl-2-hydroxynicotinic acid
6-(m-nitrophenyl)-5-ethyl-2-hydroxynicotinic acid
6-(p-nitrophenyl)-5-ethyl-2-hydroxynicotinic acid
6-(p-bromophenyl)-5-ethyl-2-hydroxynicotinic acid
6-(p-chlorophenyl)-5-ethyl-2-hydroxynicotinic acid
6-(p-fluorophenyl)-5-ethyl-2-hydroxynicotinic acid
6-(p-vinylphenyl)-5-ethyl-2-hydroxynicotinic acid
6-(p-propoxyphenyl)-5-ethyl-2-hydroxynicotinic acid
6-phenyl-4-ethyl-2-hydroxynicotinic acid
6-(p-chlorophenyl)-4-methyl-2-hydroxynicotinic acid When the 2-amino-6-arylnicotinic acid ethyl esters or 2-amino-6-arylnicotinamides of Example 57 are used in place of 5-(p-fluorophenyl)-2-hydroxynicotinonitrile in the above example, the corresponding 2-amino-6-arylnicotinic acid hydrochlorides are obtained.

EXAMPLE 52

6-amino-5-(p-fluorophenyl)-2-hydroxy-4-methylnicotinonitrile

To a solution of sodium ethoxide [fom sodium (2.3 g., 0.10 g.-atom)] in absolute ethanol (200 ml.) are added successively, cyanoacetamide (8.4 g., 0.10 mole) and α-(p-fluorophenyl)-β-isobutoxycrotononitrile [prepared following the procedure outlined by B. H. Chase and J. Walker, J. Chem. Soc., 3518 (1953)] (23.3 g., 0.10 mole), and the mixture is heated under reflux for 3 hours.

Upon cooling, the mixture is diluted with an equivalent quantity of water, and extracted thoroughly with ether. The aqueous phase is acidified with acetic acid and chilled. 6-amino-5-(p-fluorophenyl)-2-hydroxy-4-methylnicotinonitrile is collected by filtration, and washed with cold water.

When α-(p-kuorophenyl)-β-isobutoxycrotononitrile is replaced in the above example by other acrylonitrile derivatives of the general formula

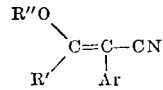

(where R" is methyl or i-butyl, and R' and Ar are as defined above, prepared from the α-acrylarylacetonitriles of Table I below following the method of B. H. Chase and J. Walker, J. Chem. Soc. 3518 (1953) and P. B. Russell and G. H. Hitchings, J. Am. Chem. Soc., 73, 3767 (1951), the corresponding 6-amino-5-aryl-2-hydroxy-4-(R'-substituted)nicotinonitriles of Table II below are obtained.

Table I 2-(o-bromophenyl)cyanoacetaldehyde
2-(p-chlorophenyl)cyanoacetaldehyde
2-(2,3-dimethylphenyl)cyanoacetaldehyde
2-(p-methylphenyl)cyanoacetaldehyde
2-(p-methoxyphenyl)cyanoacetaldehyde
2-(pmethylthiophenyl)cyanoacetaldehyde
2-(3,4-dimethoxyphenyl)cyanoacetaldehyde
2-(o-methylphenyl)acetoacetonitrile
2-(p-ethylphenyl)acetoacetonitrile
2-(o-methoxyphenyl)acetoacetonitrile
2-(3,4-dimethoxyphenyl)acetoacetonitrile
2-(p-chlorophenyl)acetoacetonitrile
2-(3,4-dichlorophenyl)acetoacetonitrile
2-(3-chloro-4-methoxyphenyl)acetoacetonitrile
2-phenyl-3-oxovaleronitrile
2-(p-chlorophenyl)-3-oxovaleronitrile
2-(3,4-dichlorophenyl)-3-oxovaleronitrile
2-(p-methoxyphenyl)-3-oxovaleronitrile
2-(3,4-dimethoxyphenyl)-3-oxovaleronitrile
2-(3,4-trimethoxyphenyl)-3-oxovaleronitrile Table II 6-amino-5-(o-bromophenyl)-2-hydroxynicotinonitrile
6-amino-5-(p-chlorophenyl)-2-hydroxynicotinonitrile
6-amino-5-(2,3-dimethylphenyl)-2-hydroxynicotinonitrile
6-amino-5-(p-methylphenyl)-2-hydroxynicotinonitrile
6-amino-5-(p-methoxyphenyl)-2-hydroxynicotinonitrile
6-amino-5-(p-methylthiophenyl)-2-hydroxynicotinonitrile
6-amino-5-(3,4-dimethoxyphenyl)-2-hydroxynicotinonitrile
6-amino-5-(o-methylphenyl)-2-hydroxy-4-methylnicotinonitrile
6-amino-5-(p-ethylphenyl)-2-hydroxy-4-methylnicotinonitrile
6-amino-5-(o-methoxyphenyl)-2-hydroxy-4-methylnicotinonitrile
6-amino-5-(3,4-dimethoxyphenyl)-2-hydroxy-4-methylnicotinonitrile
6-amino-5-(p-chlorophenyl)-2-hydroxy-4-methylnicotinonitrile
6-amino-5-(3,4-dichlorophenyl)-2-hydroxy-4-methylnicotinonitrile
6-amino-5-(3-chloro-4-methoxyphenyl)-2-hydroxy-4-methylnicotinonitrile
6-amino-5-phenyl-2-hydroxy-4-ethylnicotinonitrile
6-amino-5-(p-chlorophenyl)-2-hydroxy-4-ethylnicotinonitrile
6-amino-5-(3,4-dichlorophenyl)-2-hydroxy-4-ethylnicotinonitrile
6-amino-5-(p-methoxyphenyl)-2-hydroxy-4-ethylnicotinonitrile
6-amino-5-(3,4-dimethoxyphenyl)-2-hydroxy-4-ethylnicotinonitrile
6-amino-5-(3,4,5-trimethoxyphenyl)-2-hydroxy-4-ethylnicotinonitrile

EXAMPLE 53

6-chloro-5-(p-xuorophenyl)-2-hydroxy-4-methylnicotinonitrile

A suspension of 6-amino-5-(p-zuorophenyl)-2-hydroxy-4-methylnicotinonitrile (12.2 g., 0.050 mole) in warm concentrated hydrochloric acid (22.5 ml.) is treated with sufficient glacial acetic acid to achieve complete solution (5–10 ml.). To the solution at 40–45° is added sodium nitrite (5.2 g., 0.075 mole) in sufficiently small portions as the keep the temperature from exceeding 50°.

When the addition is complete, the solution is chilled thoroughly. 6 - chloro-5-(p-fluorophenyl)-2-hydroxy-4-methylnicotinonitrile is collected by filtration, and washed well with cold water.

When the 6-amino-5-aryl-2-hydroxy-4-(R'-substituted) nicotinonitriles of Example 52 are used in place of 6-amino-5-(p-fluorophenyl)-2-hydroxy - 4 - methylnicotinonitrile in the above example, the corresponding 6-chloro analogs are obtained.

EXAMPLE 54

6-chloro-5-(p-fluorophenyl)-2-hydroxy-4-methylnicotinic acid 6-chloro-5-(p-fluorophenyl)-2-hydroxy - 4 - methylnicotinonitrile (5.3 g., 0.020 mole) is treated with 48% hydrobromic acid (20 ml.) and glacial acetic acid (5 ml.), and the mixture is heated under reflux for 8 hours. The bulk of the solvent is removed by evaporation in vacuo, and the residue is diluted with water and chilled thoroughly. 6 - chloro-5-(p-fluorophenyl)-2-hydroxy-4-methylnicotinic acid is collected by filtration, and washed thoroughly with cold water.

When the 5-aryl-6-chloro-2-hydroxy-4-(R'-substituted) nicotinonitriles of Example 53 are used in place of 6-chloro-5-(p - fluorophenyl)-2-hydroxy-4-methylnicotinonitrile in the above example, the corresponding nicotinic acids are obtained.

EXAMPLE 55

5-aryl-2-hydroxy-4-methylnicotinic acid

When the 5-aryl-6-chloro-2-hydroxy-4-(R'-substituted) nicotinic acids of Example 54 are treated according to the procedure of Example 4, the corresponding 5-aryl-2-hydroxy-4-(R'-substituted)nicotinic acids of Table I below are obtained.

Table I 5-(p-fluorophenyl)-2-hydroxy-4-methylnicotinic acid
5-(o-bromophenyl)-2-hydroxynicotinic acid
5-(p-chlorophenyl)-2-hydroxynicotinic acid
5-(2,3-dimethylphenyl)-2-hydroxynicotinic acid
5-(p-methylphenyl)-2-hydroxynicotinic acid
5-(p-methoxyphenyl)-2-hydroxynicotinic acid
5-(p-methylthiophenyl)-2-hydroxynicotinic acid
5-(3,4-dimethoxyphenyl)-2-hydroxynicotinic acid
5-(o-methylphenyl)-2-hydroxy-4-methylnicotinic acid
5-(p-ethylphenyl)-2-hydroxy-4-methylnicotinic acid
5-(o-methoxyphenyl)-2-hydroxy-4-methylnicotinic acid
5-(3,4-dimethoxyphenyl)-2-hydroxy-4-methylnicotinic acid
5-(p-chlorophenyl)-2-hydroxy-4-methylnicotinic acid
5-(3,4-dichlorophenyl)-2-hydroxy-4-methylnicotinic acid
5-(3-chloro-4-methoxyphenyl)-2-hydroxy-4-methylnicotinic acid
5-phenyl-2-hydroxy-4-ethylnicotinic acid
5-(p-chlorophenyl)-2-hydroxy-4-ethylnicotinic acid
5-(3,4-dichlorophenyl)-2-hydroxy-4-ethylnicotinic acid
5-(p-methoxyphenyl)-2-hydroxy-4-ethylnicotinic acid
5-(3,4-dimethoxyphenyl)-2-hydroxy-4-ethylnicotinic acid
5-(3,4,5-trimethoxyphenyl)-2-hydroxy-4-ethylnicotinic acid

EXAMPLE 56

6-(p-chlorophenyl)-2-hydroxynicotinonitrile

A solution containing the sodium salt of p-chlorobenzoylacetaldehyde [prepared following the procedure outlined by H. G. Garg and M. M. Bokadia, J. Indian. Chem. Soc., 34, 286 (1957)] (20.4 g., 0.10 mole) and cyanoacetamide (8.4 g., 0.10 mole) in water (50 ml.) is treated with a solution prepared by dissolving acetic acid (1.2 ml.) in water (3 ml.) and adding sufficient piperidine to make the solution basic. The mixture is then refluxed for 2 hours, cooled, and acidified with acetic acid. 6-(p-chlorophenyl)-2-hydroxynicotinonitrile is collected by filtration and washed thoroughly with cold water.

When the hydroxymethyleneacetophenones of Example 35 are user in place of p-chlorobenzoylacetaldehyde in the above example, the corresponding 6-aryl-2-hydroxynicotinonitriles are obtained.

Acetals of the general formula

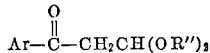

where R″ is alkyl, may also be used in place of p-chlorobenzoylacetaldehyde in the above example; the corresponding 6-aryl-2-hydroxynicotinonitriles are obtained.

The acetals are prepared from the 3-chloroacrylophenones of Example 38 by the method of N. K. Kochetkov, Doklady Akad. Nauk S.S.S.R., 84, 289 (1952).

β-dicarbonyl compounds of the general formulae

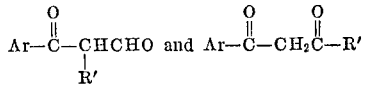

[see C.A. 53: 18003f; C.A. 43: 2174e and C.A. 46: 3498e] may also be used in place of p-chlorobenzoylacetaldehyde in the above example; the corresponding 6-aryl-2-hydroxy-5- and 4-(R′-substituted)nicotinonitriles, respectively, are obtained. Such β-dicarbonyl compounds that may be used are:

2-benzoylpropionaldehyde
2-(p-methylbenzoyl)propionaldehyde
2-(2,4-dimethylbenzoyl)propionaldehyde
2-(2-methylthio-5-methylbenzoyl)propionaldehyde
2-(o-methoxybenzoyl)propionaldehyde
2-(p-methoxybenzoyl)propionaldehyde
2-(2,6-dimethoxybenzoyl)propionaldehyde
2-benzoylbutyraldehyde
2-(p-methylbenzoyl)butyraldehyde
2-(p-methoxybenzyl)butyraldehyde
2-(o-nitrobenzoyl)butyraldehyde
2-(m-nitrobenzoyl)butyraldehyde
2-(p-nitrobenzoyl)butyraldehyde
2-(p-bromobenzoyl)butyraldehyde
2-(p-chlorobenzoyl)butyraldehyde
2-(p-fluorobenzyl)butyraldehyde
2-(p-vinylbenzoyl)butyraldehyde
2-(p-propoxybenzoyl)butyraldehyde
1-phenyl-1,3-pentanedione
1-(p-chlorophenyl)-1,3-butanedione Ethyl cyanoacetate may be used in place of cyanoacetamide in the above example; 6-aryl-2-hydroxynicotinic acid ethyl esters are thereby obtained.

EXAMPLE 57

Ethyl 2-amino-6-(p-chlorophenyl)nicotinate

An ethereal solution of p-chlorobenzoylacetaldehyde [prepared by the procedure outlined by H. G. Garg and M. M. Bokadia, J. Indian Chem. Soc., 34, 286 (1957)] (3.7 g., 0.020 mole) and ethyl α-carboethoxyacetamidate [prepared by the procedure outlined by (a) A. Dornow and P. Karlson, Ber. 73B, 542 (1940) and (b) Hawes and Wibberley, J. Chem. Soc. (C), 315 (1966)] (6.4 g., 0.040 mole) is heated at reflux for 12 hours.

The ether is then removed by distillation and replaced with ethanol. The ethanolic solution is warmed on the steam-bath overnight, and then is treated while still warm with a slight excess of an ethanolic solution of picric acid. The solution is chilled thoroughly, the picrate recovered by filtration, and decomposed in concentrated hydrochloric acid. The picric acid is extracted into ether, and the aqueous solution is rendered alkaline with potassium carbonate. The liberated ethyl 2-amino-6-(p-chlorophenyl)nicotinate is extracted into chloroform, the extracts dried over sodium sulfate, filtered, and evaporated, and the residue crystallized from a little ethanol.

When the β-dicarbonyl compounds, ArCOCHR′CHO and ArCOCH₂COR′ (R′=H, lowar alkyl) of Example 56 are used in place of p-chlorobenzylacetaldehyde in the above example, the corresponding 2-amino-6-arylnicotinic acid ethyl esters are obtained.

Ethyl α-carboethoxyacetimidate may be replaced in the above example by malonamidamidine [prepared by the procedure outlined by A. Dornow and E. Neuse, Chem. Ber., 84, 296 (1951)] (1 equivalent); the reaction is then carried out in ethanol rather than ether to give 2-amino-6-arylnicotinamides.

EXAMPLE 58

6-(p-chlorophenyl)-2-hydroxynicotinic acid

The 2-amino-6-arylnicotinic acids of Example 51 are converted to the corresponding 6-aryl-2-hydroxynicotinic acids by the procedure outlined in Example 15.

EXAMPLE 59

2-(p-fluorophenyl)-8-methoxyquinoline

A solution of p-fluorophenyllithium is prepared by treating lithium metal shavings (3.5 g., 0.50 g.-atom) in anhydrous ether (300 ml.) with p-fluorobromobenzene (43.8 g., 0.25 mole), added dropwise, with stirring, at such a rate that the ether refluxes gently. When the addition is complete, and the reaction subsides, a solution of 8-methoxyquinoline (8.0 g., 0.050 mole) in ether is added dropwise over ca. 10 minutes. Stirring is then continued for one hour.

The mixture is poured over cracked ice, and the ether layer is separated, dried over anhydrous magnesium sulfate, filtered, and evaporated in vacuo. 2-(p-fluorophenyl)-8-methoxyquinoline is isolated from the residue by fractional distillation in vacuo.

p-Fluorobromobenzene may be replaced in the above example by any appropriate aryl bromide; the corresponding 2-aryl-8-methoxyquinolines are thereby obtained.

When 6-methoxyquinoline is used in place of 8-methoxyquinoline in the above example, the corresponding 2-aryl-6-methoxyquinolines are obtained.

EXAMPLE 60

6-(p-fluorophenyl)-2-hydroxynicotinic acid

A solution of 2-(p-fluorophenyl)-8-methoxyquinoline (8.6 g., 0.034 mole) in 50% acetic acid (200 ml.) is treated with an aqueous 5% solution of potassium permanganate (1000 ml.) added gradually with stirring over three hours.

The precipitated solids are collected by filtration and washed well with water, and then are extracted repeatedly with dilute aqueous akali. The combined extracts are acidified with acetic acid and chilled thoroughly. 6-(p-fluorophenyl)-2-hydroxynicotinic acid is collected by filtration, and washed with cold water.

When the 2-aryl-6- or 8-methoxyquinolines of Example 59 are used in place of 2 - (p-fluorophenyl)-8-methoxyquinoline in the above example, the corresponding 6-aryl-2-hydroxynicotinic acids are obtained.

EXAMPLE 61

6-(o-fluorophenyl)-2-hydroxynicotinic acid 6-(o-fluorophenyl)quinolinic acid (13.1 g., 0.050 mole) is converted to the anhydride by treatment with acetic anhydride (75 ml.) for 5 hours on the steambath.

The solvent is removed under reduced pressure, and the residue is taken up in methyl ethyl ketone (100 ml.). This solution is treated with ammonia gas.

The precipitated α-monoamide is collected at frequent intervals, the filtrate each time being treated again with ammonia until no further precipitation occurs. The total collected product is washed thoroughly with water, and dried.

The α-monoamide is converted to 2-amino-6-(o-fluorophenyl)nicotinic acid by the procedure of Example 14, and the 2-amino compound is treated further according to the procedure of Example 15 to give 6-(o-fluorophenyl)-2-hydroxynicotinic acid.

When the 5- and 6-arylquinoline acids of Example 26 are used in place of 6-(o-fluorophenyl)-quinolinic acid in the above example, the corresponding 5- and 6-aryl-2-hydroxynicotinic acids are obtained.

EXAMPLE 62

2- and 4-chloro-6-(p-fluorophenyl)nicotinic acid

A solution of 6-(p-fluorophenyl)nicotinic acid (32.6 g., 0.15 mole) in glacial acetic acid (27.0 g., 0.45 mole) is treated with aqueous 30% hydrogen peroxide (40.0 ml., 0.45 mole), and the mixture is warmed on the steam-bath with occasional shaking for three hours.

The solution is evaporated to dryness in vacuo, and the residue crystallized from methanol to give 6-(p-fluorophenyl)nicotinic acid-1-oxide.

A mixture of the N-oxide (23.3 g., 0.10 mole), phosphorus pentachloride (42.4 g., 0.20 mole), and phosphorus oxychloride (40 ml.) is heated at 115–120° for 1½ hours. Excess phosphorus oxychloride is then removed by distillation in vacuo, and the residual syrup is poured onto cracked ice (ca. 100 g.). The mixture is allowed to stand at 0° overnight, and the 2-chloro-6-(p-fluorophenyl)nicotinic acid is collected by filtration and washed thoroughly with cold water.

Evaporation of the combined filtrate and washings to a final volume of ca. 50 ml. and thorough chilling gives 4-chloro-6-(p-fluorophenyl)nicotinic acid.

When the 6-arylnicotinic acids of Examples 33 and 37 are used in place of 6-(p-fluorophenyl)nicotinic acid in the above example, the corresponding 6-aryl-2- and 4-chloronicotinic acids are obtained.

EXAMPLE 63

6-(p-fluorophenyl)-4-hydroxynicotinic acid 4-chloro-6-(p-fluorophenyl)nicotinic acid (1.3 g., 0.005 mole) is heated for 1 hour in water (25 ml.). The pH of the solution is then adjusted to ca. 4 with aqueous sodium hydroxide, the volume is reduced to ca. 15 ml. by evaporation, and the mixture is chilled thoroughly. 6-(p-fluorophenyl)-4-hydroxynicotinic acid is collected by filtration, and washed thoroughly with cold water.

When the 6-aryl-2- or 4-chloronicotinic acids of Example 62 are used in place of 4-chloro-6-(p-fluorophenyl)nicotinic acid in the above example, the corresponding 6 - aryl-2- or 4 - hydroxynicotinic acids of Table I below are obtained.

Table I 6-phenyl-2- or 4-hydroxynicotinic acids
6-(o-, m- and p-fluorophenyl-2- or 4-hydroxynicotinic acids
6-(o-, m- and p-methoxyphenyl)-2- or 4-hydroxynicotinic acids
6-(3,4-dimethoxyphenyl)-2- or 4-hydroxynicotinic acids
6-(o-, m- and p-carboxyphenyl)-2- or 4-hydroxynicotinic acids
6-(2,4-dimethylphenyl)-2- or 4-hydroxynicotinic acids
6-(2,6-dimethylphenyl)-2- or 4-hydroxynicotinic acids
6-(o-, m- and p-trifluoromethylphenyl)-2- or 4-hydroxynicotinic acids
6-(o-, m- and p-nitrophenyl)-2- or 4-hydroxynicotinic acids

EXAMPLE 64

2-(p-fluorophenyl)-4-pyridinol

Sodioacetoacetaldehyde (15.1 g., 0.14 mole) and potassium amide (from potassium 5.8 g., 0.15 g.-atom) are stirred for 1 honr in anhydrous liquid ammonia (800 ml.). To this solution is then added methyl p-fluorobenzoate (10.8 g., 0.07 mole), with continued stirring.

The ammonia is allowed to evaporate and a mixture of ether and ice-water is added to the residue. The mixture is shaken thoroughly, the aqueous phase separated, acidified with cold hydrochloric acid, and extracted repeatedly with fresh ether. The combined ether extracts are dried over anhydrous sodium sulfate, filtered, and evaporated in vacuo. The residue is triturated with a little ether, the p-fluorobenzoylacetoacetaldehyde collected by filtration and washed well with cold ether.

The diketoaldehyde is dissolved in ethanolic ammonia, and the solution is heated briefly on the steam-bath. The solvent is evaporated in vacuo, and the residue is triturated with a little ether. 2-(p-fluorophenyl)-4-pyridinol is collected by filtration, and washed with ether.

When the aromatic esters of Table I below are used in place of methyl p-fluorobenzoate in the above example, the corresponding 2-aryl-4-pyridinols are obtained.

Table I methyl o-, m- and p-chloroenzoate
methyl o- and m-fluorobenzoate
methyl o-, m- and p-nitrobenzoate
methyl o-, m- and p-methoxybenzoate
methyl p-dimethylaminobenzoate
methyl p-methylthiobenzoate
methyl o-, m- and p-trifluoromethylbenzoate
methyl p-vinylbenzoate

EXAMPLE 65

6-(p-fluorophenyl)-4-hydroxynicotinic acid

The thoroughly dried sodium salt of 2-(p-fluorophenyl)-4-pyridinol (10.6 g., 0.05 mole) is heated for 3 hours at 220° with dry carbon dioxide at a pressure of 50 atm.

The mixture is taken up in water (50 ml.), and the solution is acidified with concentrated hydrochloric acid, filtered from carbonized material, and neutralized with sodium bicarbonate. Unreacted pyridinol is removed by filtration, and the filtrate is acidified with acetic acid, and chilled thoroughly. 6 - (p - fluorophenyl) - 4 - hydroxynicotinic acid is collected by filtration, and washed well with cold water.

When the 2-aryl-4-pyridinols of Example 64 are used in place of 2 - (p-fluorophenyl) - 4 - pyridinol in the above example, the corresponding 6 - aryl - 4 - hydroxynicotinic acids of Table I below are obtained.

Table I 6-(o-, m- and p-chlorophenyl)-4-hydroxynicotinic acid
6-(o-, and m-fluorophenyl)-4-hydroxynicotinic acid
6-(o-, m- and p-nitrophenyl)-4-hydroxynicotinic acid
6-(o-, and m- and p-methoxyphenyl)-4-hydroxynicotinic acid
6-(p-dimethylaminophenyl)-4-hydroxynicotinic acid
6-(p-methylthiophenyl)-4-hydroxynicotinic acid
6-(o-, m- and p-trifluoromethylphenyl)-4-hydroxynicotinic acid
6-(p-vinylphenyl)-4-hydroxynicotinic acid.

EXAMPLE 66

6-(p-chlorophenyl)-4-hydroxynicotinic acid

The 6-arylcinchomeronic acids of Examples 7 and 8 are converted to the corresponding γ-monoamides following the procedure of Example 61. The latter are treated further according to the procedures of Examples 14 and 15 to give the corresponding 6-aryl-4-hydroxynicotinic acids.

EXAMPLE 67

N-(p-fluorophenyl)-4-pyridone-3-carboxylic acid 4-fluoroaniline is condensed with ethyl β-hydroxyacrylate in the presence of dilute aqueous acetic acid to give ethyl β-(p-fluoroanilino)acrylate; this, when heated in vacuo 10° below its M.P., gives the β-(p-fluoroanilino) diacrylic ester which subsequently cyclizes in the presence of alcoholic potassium hydroxide to N-(p-fluorophenyl)-4-pyridone - 3 - carboxylic acid. Experimental details for the general method are provided by M. V. Rubtsov, J. Gen. Chem. (U.S.S.R), 9, 157 (1939); J. Gen. Chem. (U.S.S.R.), 7, 1885 (1937).

Preparation of acyloxy derivatives

To 0.015 mole of 5-(p-fluorophenyl)-2-hydroxynicotinic acid is added 3.1 g. (0.030 mole) of acetic anhydride and a catalytic amount of concentrated sulfuric acid (1 drop). The mixture is warmed on the steam bath with frequent agitation for 30 minutes. After cooling, the mixture is taken to dryness in vacuo to give 5-(p-fluorophenyl)-2-acetoxynicotinic acid.

When propionic anhydride, butyric anhydride, isobutyric anhydride, valeric anhydride, benzoic anhydride and phenylacetic anhydride are used in place of acetic anhydride in the procedure described above, then the corresponding acyloxy derivative is prepared.

When the arylpyridine carboxylic acids, esters or amides of this invention are substituted in the above example for 5-(p-fluorophenyl) - 2 - hydroxynicotinic acid, the corresponding acyloxy-acids, acyloxy-esters and acyloxy-amides are prepared. A representative list of products obtained are shown below.

2-phenyl-5-acetoxyisonicotinic acid
2-(p-fluorophenyl)-5-propionoxyisonicotinic acid
methyl 2-(p-fluorophenyl)-5-benzoyloxyisonicotinate
5-(o-methylphenyl)-3-valeryloxypicolinic acid
5-(p-fluorophenyl)-3-acetoxypicolinic acid
6-phenyl-3-acetoxypicolinyl cyclopropylamide
6-(p-fluorophenyl)-3-butyryloxypicolinic acid
5-(p-dimethylaminophenyl)-2-acetoxynicotinyl dimethylamide
5-(p-fluorophenyl)-2-phenylacetoxynicotinic acid
5-(β-naphthyl)-2-acetoxynicotinic acid
6-(p-fluorophenyl)-2-isobutyryloxynicotinic acid
methyl 6-(2,6-dimethylphenyl)-2-acetoxynicotinate
6-(p-chlorophenyl)-4-acetoxynicotinyl dimethylamide
6-(p-fluorophenyl)-4-propionoxynicotinic acid Preparation of esters To a mixture of 0.015 moles of 6-(p-fluorophenyl)-3-hydroxypicolinic acid and 6.1 ml. (0.15 mole) of absolute methanol is added, slowly with stirring, 0.6 ml. of concentrated sulfuric acid. The mixture is then heated under reflux for 8 hours. The excess methanol is removed by evaporation in vacuo and the residue is treated with stirring with 25 ml. of ice-water. The methyl 6-(p-fluorophenyl) - 3 - hydroxypicolinate is collected by filtration, washed thoroughly with cold water and dried. It is purified by recrystallization from aqueous alcohol.

When ethanol, propanol, isopropanol, butanol, isobutanol, t-butanol and benzyl alcohol are used in place of methanol in the procedure described above, the corresponding ester is prepared.

When the arylpyridine carboxylic acids of this invention are substituted in the above example for 6-(p-fluorophenyl)-3-hydroxypicolinic acid, the corresponding esters are prepared. A representative list of ester products obtained is shown below.

methyl 2-phenyl-5-hydroxyisonicotinate
methyl 2-(p-fluorophenyl)-5-acetoxyisonicotinate
methyl 2-(p-fluorophenyl)-5-methoxyisonicotinate
methyl 5-(o-methylphenyl)-3-acetoxypicolinate
benzyl 5-(p-fluorophenyl)-3-actoxypicolinate
ethyl 6-phenyl-3-hydroxypicolinate
methyl 6-(p-fluorophenyl)-3-acetoxypicolinate
t-butyl 6-(p-chlorophenyl)-3-ethoxypicolinate
methyl 5-(p-dimethylaminophenyl)-2-hydroxynicotinate
ethyl 5-(p-fluorophenyl)-2-acetoxynicotinate
methyl 5-(β-naphthyl)-2-acetoxynicotinate
benzyl 5-(3,4,5-trimethoxyphenyl)-2-hydroxynicotinate
benzyl 6-(p-fluorophenyl)-2-acetoxynicotinate
methyl 6-(2,6-dimethylphenyl)-2-methoxynicotinate
methyl 6-(pentafluorophenyl)-2-hydroxynicotinate
i-propyl 6-(p-chlorophenyl)-4-hydroxynicotinate
methyl 6-(p-fluorophenyl)-4-acetoxynicotinate Preparation of amides To a solution of 0.022 mole of 5-acetoxy-2-(p-fluorophenyl)isonicotinic acid in 30 ml. of anhydrous benzene is added 2.86 g. (0.024 mole) of thionyl chloride. The reaction mixture is refluxed for 1½ hours and the solvent evaporated in vacuo to yield 5-acetoxy-2-(p-fluorophenyl) isonicotinyl chloride.

To 20 ml. of morpholine is added, dropwise and with cooling, the isonicotinyl chloride prepared above. The reaction mixture is stirred at room temperature for 2 hours, neutralized with 2.5 N hydrochloric acid, and extracted well with methylene chloride. The combined methylene chloride extracts are then extracted with 2.5 N sodium hydroxide, washed with water, dried over sodium sulfate and concentrated in vacuo to yield 5-acetoxy-2-(p-fluorophenyl)isonicotinyl morpholide.

When ammonia, methylamine, diethylamine, cyclopropylamine, piperidine, piperazine, homopiperazine and pyrrolidine are used in place of morpholine in the procedure described above, then the amido, methylamido, diethylamido, cyclopropylamido, piperidino, piperazino, homopiperazino and pyrrolidino amides of 5-acetoxy-2-(p-fluorophenyl)isonicotinic acid are prepared.

When the arylpyridine carboxylic acids of this invention are substituted in the above example for 5-acetoxy-2-(p - fluorophenyl)isonicotinic acid, the corresponding amides are prepared. A representative list of amide products obtained are shown below.

2-phenyl-5-hydroxyisonicotinamide
2-(p-fluorophenyl)-5-acetoxyisonicotinamide
2-(p-fluorophenyl)-5-methoxyisonicotinyl diethylamide
5-(o-methylphenyl)-3-acetoxypicolinamide
5-(p-fluorophenyl)-3-acetoxypicolinyl piperidide
6-phenyl-3-hydroxypicolinyl cyclopropylamide
6-(p-fluorophenyl)-3-acetoxypicolinamide
6-(p-chlorophenyl)-3-acetoxypicolinamide
5-(p-dimethylaminophenyl)-2-hydroxynicotinyl dimethylamide
5-(p-fluorophenyl)-2-acetoxynicotinamide
5-(β-naphthyl)-2-acetoxynicotinamide
5-(3,4,5-trimethoxyphenyl-2-hydroxynicotinyl pyrrolidide
6-(p-fluorophenyl)-2-acetoxynicotinamide
6-(2,6-dimethylphenyl)-2-methoxynicotinyl dimethylamide
6-(pentafluorophenyl)-2-hydroxynicotinamide
6-(p-chlorophenyl)-4-hydroxynicotinyl methylamide
6-(p-fluorophenyl)-4-acetoxynicotinamide Preparation of alkoxy derivatives Methyl 6 - (p-fluorophenyl)-3-hydroxypicolinate (0.01 mole), sodium (230 mg., 0.010 g. atom) in anhydrous methanol (10 ml.) and methyl iodide (1.6 g., 0.011 mole) are heated together under reflux for several hours. The methanol is removed by evaporation in vacuo and the residue is treated with 25 ml. of water. The mixture is rendered alkaline with sodium hydroxide to ensure dissolution of unaltered starting material, and then is extracted twice with 25 ml. portions of ether. The combined ethereal extracts are dried over anhydrous magnesium sulfate and evaporated in vacuo to give methyl 6-(p-fluorophenyl)-3-methoxypicolinate.

The methyl ester is hydrolyzed under reflux by potassium hydroxide (0.7 g., 0.0125 mole) in alcohol (12.5 ml.). The solution is evaporated to dryness in vacuo and the residue taken up in 25 ml. of water. The aqueous solution is filtered and the filtrate acidified with hydrochloric acid. The precipitated 6-(p-fluorophenyl)-3-methoxypicolinic acid is collected by filtration and recrystalized from alcohol.

When ethyl iodide, propyl iodide, butyl iodide, t-butyl iodide, vinyl bromide, allyl bromide and benzyl chloride are used in place of methyl iodide in the procedure described above, the corresponding alkoxy derivative is prepared.

When the picolinates and isonicotinates of this invention are substituted in the above example for 6-(p-fluorophenyl) - 3 - hydroxypicolinate, the corresponding alkoxy derivatives of these esters are prepared, which may be hydrolyzed to the corresponding acids as above. A representative list of these alkoxy derivatives is shown below.

methyl 2-phenyl-5-ethoxyisonicotinate
2-(p-fluorophenyl)-5-methoxyisonicotinic acid
2-(p-fluorophenyl)-5-allyloxyisonicotinic acid
5-(o-methylphenyl)-3-methoxypicolinic acid
ethyl 5-(p-fluorophenyl)-3-benzyloxypicolinate
6-phenyl-3-methoxypicolinic acid
6-(p-fluorophenyl)-3-propoxypicolinic acid
methyl 6-(p-fluorophenyl)-3-phenoxypicolinate
6-(p-chlorophenyl)-3-methoxypicolinic acid
5-(p-dimehtylaminophenyl)-2-methoxynicotinic acid
methyl 5-(p-fluorophenyl)-2-t-butoxynicotinate
5-(β-naphthyl)-2-methoxynicotinic acid
methyl 5-(3,4,5-trimethoxyphenyl)-2-methoxynicotinate
methyl 6-(p-fluorophenyl)-2-allyloxynicotinate
6-(2,6-dimethylphenyl)-2-methoxynicotinic acid
6-pentafluorophenyl-2-methoxynicotinic acid
6-(p-chlorophenyl)-4-methoxynicotinic acid
methyl 6-(p-fluorophenyl)-4-propoxynicotinate 6-(p-fluorophenyl)-3-ethoxynicotinic acid (A) Ethyl 6 - (p - fluorophenyl) - 3 - chloronicotinate.—Ethyl 6 - (p - fluorophenyl) - 3 - hydroxynicotinate (0.05 mole) is treated with phosphorus oxychloride (20 g., 0.13 mole). To the mixture, finely pulverized phosphorus pentachloride (21 g., 0.10 mole) is added in small portions. Once the evolution of hydrogen chloride has subsided, the mixture is warmed on the steam-bath for 1 hour.

Excess phosphorus oxychloride is removed by evaporation in vacuo, and the residual syrup is poured onto cracked ice (ca. 50 g.). The mixture is extracted with chloroform (3 × 50 ml.), the combined extracts washed with water, dried over anhydrous sodium sulfate, filtered, and evaporated to give ethyl 6-(p-fluorophenyl)-3-chloronicotinate.

(B) Ethyl 6 - (p - fluorophenyl)-3-ethoxynicotinate.— To a solution of sodium (2.3 g., 0.10 g. atom in absolute ethanol (100 ml.) is added ethyl 6-(p-fluorophenyl)-3-chloronicotinate (0.015 mole). The solution is refluxed for 1.5 hours. After neutralization by passing dry $CO_2$ gas and centrifugation, the resultant solution is evaporated to dryness under reduced pressure. The residue is taken up in water and extracted with ether. The ethereal layer is washed with water, dried over $Na_2SO_4$, and evaporated. Recrystallization of the residue from aqueous acetone gives ethyl 6-(p-fluorophenyl)-3-ethoxynicotinate.

(C) 6-(p-fluorophenyl) - 3 - ethoxynicotinic acid.—The ethoxy ester is hydrolyzed with alcoholic potassium hydroxide by the procedure of Example 10 to give 6-(p-fluorophenyl)-3-ethoxynicotinic acid.

The procedure outlined in the preceding example may be applied to the preparation of other alkoxy nicotinic acids by substituting the appropriate hydroxy carboxylic acid ester. A representative list of the products is shown below.

methyl 5-(p-dimethylaminophenyl)-2-hydroxynicotinate
ethyl 5-(p-fluorophenyl)-2-ethoxynicotinate
5-(β-naphthyl)-2-phenoxynicotinic acid
benzyl 5-(3,4,5-trimethoxyphenyl)-2-allyloxynicotinate
6-(p-fluorophenyl)-2-methoxynicotinic acid
methyl 6-(2,6-dimethylphenyl)-2-benzyloxynicotinate
methyl 6-(pentafluorophenyl)-2-propoxynicotinate
i-propyl 6-(p-chlorophenyl)-4-methoxynicotinate
6-(p-fluorophenyl)-4-ethoxynicotinic acid Preparation of salts Sodio 6 - (p-fluorophenyl)-3-hydroxypicolinate.—To a solution of 0.001 mole of sodium hydroxide in 15 ml. of water is added 0.001 mole of 6-(p-fluorophenyl)-3-hydroxypicolinic acid in 10 ml. of ethanol. The mixture is stirred and heated for two hours and evaporated in vacuo to obtain sodio 6-(p-fluorophenyl)-3-hydroxypicolinate.

When an equivalent amount of potassium hydroxide, lithium carbonate, aluminum hydroxide, sodium carbonate or calcium hydroxide are used in place of sodium hydroxide, the corresponding salt is prepared.

When the 6-(p-fluorophenyl)-3-hydroxypicolinic acid of the above procedure is replaced by any of the carboxylic acid compounds of this invention, the corresponding salt is prepared.

When two equivalents of the above bases are used in the above examples, the corresponding di-salt is prepared.

The following representative examples illustrate the interconversion or introduction of functional groups which can be accomplished at various stages of the preparation of the final products.

Methyl 2-(p-hydroxyphenyl)-5-hydroxyisonicotinate.— A mixture of methyl 2-(p-aminophenyl)-5-hydroxyisonicotinate (0.2 mole), water (600 ml.) and concentrated sulfuric acid (25 ml.) is cooled to 10° C. and a solution of sodium nitrite (0.21 mole) in a minimum of water is added gradually. When the presence of free nitrous acid is detected (starch-iodide paper), the addition is stopped and the diazotization mixture is allowed to warm to room temperature, then heated on a steam-bath until there is no more nitrogen evolution. The mixture is cooled, extracted well with chloroform, the combined chloroform layer dried, concentrated to a residue, methanol (300 ml.) added plus 0.5 ml. concentrated sulfuric acid, the mixture heated gently for several hours, the mixture concentrated in vacuo to remove most of the methanol, the residue partitioned between chloroform-dilute sodium bicarbonate solution, the chloroform layer dried, filtered and concentrated to a residue. Chromatography of the residue on a silica gel column using an ether-petroleum ether (v./v. 0–100% ether) system as eluant yields methyl 2-(p-hydroxyphenyl)-5-hydroxyisonicotinate.

Methyl 2-(p-aminophenyl)-5-hydroxyisonicotinate.—A mixture of pure methyl 2-(p-nitrophenyl)-5-hydroxyisonicoctinate (0.01 mole) in methanol-dioxane (1:1) (ca. 200 ml.) is reacted with hydrogen at room temperature (40 p.s.i.) in the presence of 10% Pd/C (1.0 g.). The mixture is filtered, the cake washed well with methanol, the filtrate evaporated in vacuo, the residue chromatographed on a silica gel column using a methanol-methylene chloride system (v./v. 0–30% methanol) as eluant to yield methyl 2-(p-aminophenyl)-5-hydroxyisonicotinate.

Methyl 2-(p-methylthiophenyl)-5-hydroxyisonicotinate

A mixture of methyl 2-(p-mercaptophenyl)-5-hydroxyisonicotinate (0.01 mole) in a de-aerated aqueous KOH solution (0.01 mole) is treated with dimethylsulfate (0.012 mole) at room temperature over one hour, the mixture acidified, extrated well with ether, and the dried ether extracts chromatographed on a silica gel column using an ether-petroleum ether system (v./v. 0–30% ether) as eluant yielding methyl 2-(p-methylthiophenyl)-5-hydroxyisonicotinate.

2-(p-methylsulfinylphenyl)-5-hydroxyisonicotinic acid

To an ice-cooled solution of 2-(p-methylthiophenyl)-5-hydroxyisonicotinic acid (0.01 mole) in methanol-acetone is added a solution of sodium metaperiodate (0.01 mole) in a minimum of water, and the mixture stirred at 0–8° C. until precipitation of sodium iodate is completed. The iodate is removed by filtration, the solvents removed in vacuo, and the residue taken up in chloroform and ether. The combined organic extracts are dried, filtered and concentrated. Purification of the 2-(p-methylsulfinyl-phenyl)-5-hydroxyisonicotinic acid is affected via recrystallization or chromatography (silica gel) of this methyl ester.

We claim:

1. A compound having the following structure:

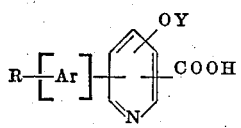

wherein Y is hydrogen or acetyl and the group OY is ortho to the carboxyl group;
Ar is phenyl,
R is halogen, and the non-toxic pharmaceutically acceptable salts thereof.

2. A compound according to claim 1 which is 2-(p-fluorophenyl)-5-hydroxyisonicotinic acid.

3. A compound according to claim 1 which is 2-(p-fluorophenyl)-5-acetoxyisonicotinic acid.

4. A compound according to claim 1 which is 5-(p-fluorophenyl)-3-hydroxypicolinic acid.

5. A compound according to claim 1 which is 5-(p-fluorophenyl)-3-acetoxypicolinic acid.

6. A compound according to claim 1 which is 6-(p-fluorophenyl)-3-hydroxypicolinic acid.

7. A compound according to claim 1 which is 6-(p-fluorophenyl)-3-acetoxypicolinic acid.

8. A compound according to claim 1 which is 5-p-fluorophenyl)-2-hydroxynicotinic acid.

9. A compound according to claim 1 which is 5-(p-fluorophenyl)-2-acetoxynicotinic acid.

10. A compound according to claim 1 which is 6-(p-fluorophenyl)-2-hydroxynicotinic acid.

11. A compound according to claim 1 which is 6-(p-fluorophenyl)-2-acetoxynicotinic acid.

12. A compound according to claim 1 which is 6-(p-fluorophenyl)-4-hydroxynicotinic acid.

13. A compound according to claim 1 which is 6-(p-fluorophenyl)-4-acetoxynicotinic acid.

References Cited

UNITED STATES PATENTS 3,449,349   6/1969   Shen et al. _____ 260—295

ALAN L. ROTMAN, Primary Examiner

U.S. Cl. X.R.

260—290 HL, 295 AM, 295 F, 295 M, 295.5 A, 295.5 B; 424—266